United States Patent
Yang

(10) Patent No.: US 9,903,974 B2
(45) Date of Patent: Feb. 27, 2018

(54) APPARATUS, COMPUTER READABLE MEDIUM, AND PROGRAM CODE FOR EVALUATING ROCK PROPERTIES WHILE DRILLING USING DOWNHOLE ACOUSTIC SENSORS AND TELEMETRY SYSTEM

(75) Inventor: Yunlai Yang, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 1024 days.

(21) Appl. No.: 13/554,019

(22) Filed: Jul. 20, 2012

(65) Prior Publication Data

US 2013/0080065 A1 Mar. 28, 2013

Related U.S. Application Data

(60) Provisional application No. 61/539,242, filed on Sep. 26, 2011.

(51) Int. Cl.
*G06F 19/00* (2011.01)
*E21B 49/00* (2006.01)
(Continued)

(52) U.S. Cl.
CPC .............. *G01V 1/50* (2013.01); *E21B 47/12* (2013.01); *G01V 2200/16* (2013.01)

(58) Field of Classification Search
CPC .......... E21B 44/00; E21B 47/091; E21B 7/04; E21B 7/06; G01V 1/288; G01V 1/306; G01V 1/42; G01V 1/48; G01V 2210/123
(Continued)

(56) References Cited

U.S. PATENT DOCUMENTS 2,155,609 A 1/1937 McClendon et al.
3,583,219 A 6/1971 Lunstroth
(Continued)

FOREIGN PATENT DOCUMENTS

CA 2508404 A1 11/2006
EP 0718641 A2 6/1996
(Continued)

OTHER PUBLICATIONS

International Search Report and Written Opinion for related PCT Application No. PCT/US2012/057201 dated Sep. 25, 2013.
(Continued)

*Primary Examiner* — John Breene
*Assistant Examiner* — Yaritza H Perez Bermudez
(74) *Attorney, Agent, or Firm* — Bracewell LLP; Constance G. Rhebergen; Brian H. Tompkins

(57) ABSTRACT

Apparatus, computer readable medium, and program code for identifying rock properties in real-time during drilling, are provided. An example of an embodiment of such an apparatus includes a downhole sensor subassembly connected between a drill bit and a drill string, acoustic sensors operably coupled to a downhole processor, a borehole telemetry system, downhole and surface data transmitting interfaces, and a surface computer operably coupled to the downhole data transmitting interface. The downhole processor is adapted to perform operations including receiving raw acoustic sensor data resulting from rotational contact of the drill bit with rock, transforming the raw acoustic sensor data into the frequency domain, filtering the transformed data, and deriving acoustic characteristics from the filtered data. The surface computer is adapted to perform operations including deriving petrophysical properties from the acoustic characteristics directly or by utilizing a petrophysical properties evaluation algorithm.

27 Claims, 7 Drawing Sheets

(51) Int. Cl.
*G01V 1/50* (2006.01)
*E21B 47/12* (2012.01)

(58) Field of Classification Search
USPC .......................................................... 702/11
See application file for complete search history.

(56) References Cited

U.S. PATENT DOCUMENTS

| | | |
|---|---|---|
| 3,626,482 A | 12/1971 | Quichaud |
| 3,948,322 A | 4/1976 | Baker |
| 3,980,986 A | 9/1976 | Baird |
| 4,303,994 A | 12/1981 | Tanguy |
| 4,349,071 A | 9/1982 | Fish |
| 4,578,675 A | 3/1986 | MacLeod |
| 4,715,451 A | 12/1987 | Bseisu et al. |
| 4,928,521 A | 5/1990 | Jardine |
| 4,964,087 A | 10/1990 | Widrow |
| 4,965,774 A | 10/1990 | Ng et al. |
| 4,992,997 A | 2/1991 | Bseisu |
| 5,109,925 A | 5/1992 | Stepp et al. |
| 5,128,901 A | 7/1992 | Drumheller |
| 5,141,061 A | 8/1992 | Henneuse |
| 5,144,298 A | 9/1992 | Henneuse |
| 5,159,226 A | 10/1992 | Montgomery |
| 5,248,857 A | 9/1993 | Ollivier |
| 5,272,925 A | 12/1993 | Henneuse et al. |
| 5,289,354 A | 2/1994 | Clayer et al. |
| 5,303,203 A | 4/1994 | Kingman |
| 5,347,859 A | 9/1994 | Henneuse et al. |
| 5,448,227 A | 9/1995 | Orban et al. |
| 5,448,911 A | 9/1995 | Mason |
| 5,510,582 A | 4/1996 | Birchak et al. |
| 5,602,541 A | 2/1997 | Comeau et al. |
| 5,678,643 A | 10/1997 | Robbins et al. |
| 5,738,171 A | 4/1998 | Szarka |
| 5,774,418 A | 6/1998 | Magendie et al. |
| 5,924,499 A | 7/1999 | Birchak et al. |
| 6,023,444 A | 2/2000 | Naville et al. |
| 6,199,018 B1 | 3/2001 | Quist et al. |
| 6,267,185 B1 | 7/2001 | Mougel et al. |
| 6,320,820 B1 | 11/2001 | Gardner et al. |
| 6,520,257 B2 | 2/2003 | Allamon et al. |
| 6,583,729 B1 | 6/2003 | Gardner et al. |
| 6,648,082 B2 | 11/2003 | Schultz et al. |
| 6,681,185 B1 | 1/2004 | Young et al. |
| 6,681,633 B2 | 1/2004 | Schultz et al. |
| 6,712,160 B1 | 3/2004 | Schultz et al. |
| 6,714,138 B1 | 3/2004 | Turner et al. |
| 6,891,481 B2 | 5/2005 | Dubinsky et al. |
| 6,909,667 B2 | 6/2005 | Shah et al. |
| 6,920,085 B2 | 7/2005 | Finke et al. |
| 6,940,420 B2 | 9/2005 | Jenkins |
| 7,036,363 B2 | 5/2006 | Yogeswaren |
| 7,068,183 B2 | 6/2006 | Shah et al. |
| 7,142,986 B2 * | 11/2006 | Moran ............................... 702/9 |
| 7,274,992 B2 | 9/2007 | Dewhurst et al. |
| 7,289,909 B2 | 10/2007 | Thomann et al. |
| 7,357,197 B2 | 4/2008 | Schultz et al. |
| 7,404,456 B2 | 7/2008 | Weaver et al. |
| 7,480,207 B2 | 1/2009 | Marsh |
| 7,516,015 B2 | 4/2009 | Sinha et al. |
| 7,571,777 B2 | 8/2009 | Wylie et al. |
| 7,590,029 B2 | 9/2009 | Tingley |
| 7,652,951 B2 | 1/2010 | Leggett, III et al. |
| 7,675,816 B2 | 3/2010 | Mathiszik et al. |
| 7,735,579 B2 | 6/2010 | Gopalan et al. |
| 7,757,759 B2 | 7/2010 | Jahn et al. |
| 7,764,572 B2 | 7/2010 | Wu et al. |
| 7,817,062 B1 * | 10/2010 | Li et al. ...................... 340/855.8 |
| 7,841,425 B2 | 11/2010 | Mansure et al. |
| 7,859,426 B2 | 12/2010 | Clark et al. |
| 7,913,773 B2 | 3/2011 | Li et al. |
| 7,966,874 B2 | 6/2011 | Hassan et al. |
| 7,974,451 B2 | 7/2011 | Matsumoto |
| 8,004,421 B2 | 8/2011 | Clark |
| 8,281,856 B2 | 10/2012 | Jahn et al. |
| 8,798,978 B2 | 8/2014 | Ertas et al. |
| 2002/0096363 A1 | 7/2002 | Evans et al. |
| 2002/0116128 A1* | 8/2002 | Sinha et al. ....................... 702/6 |
| 2002/0195276 A1 | 12/2002 | Dubinsky et al. |
| 2003/0010495 A1 | 1/2003 | Mendez et al. |
| 2003/0072217 A1 | 4/2003 | Macpherson |
| 2003/0168257 A1 | 9/2003 | Aldred et al. |
| 2004/0159428 A1 | 8/2004 | Hammond et al. |
| 2004/0200613 A1 | 10/2004 | Fripp et al. |
| 2005/0100414 A1 | 5/2005 | Salama |
| 2006/0076161 A1* | 4/2006 | Weaver et al. .................. 175/50 |
| 2006/0120217 A1 | 6/2006 | Wu |
| 2007/0030762 A1 | 2/2007 | Huang et al. |
| 2007/0189119 A1 | 8/2007 | Klotz et al. |
| 2008/0056067 A1 | 3/2008 | Jogi et al. |
| 2008/0285386 A1 | 11/2008 | Sinanovic et al. |
| 2009/0067286 A1 | 3/2009 | Bose |
| 2009/0195408 A1 | 8/2009 | Patterson et al. |
| 2009/0199072 A1 | 8/2009 | Akimov et al. |
| 2009/0201170 A1 | 8/2009 | Reckmann et al. |
| 2009/0250225 A1 | 10/2009 | Zaeper et al. |
| 2010/0008188 A1 | 1/2010 | Hall et al. |
| 2010/0038135 A1 | 2/2010 | Hummes et al. |
| 2010/0118657 A1 | 5/2010 | Trinh et al. |
| 2010/0195442 A1 | 8/2010 | Reyes |
| 2010/0200295 A1 | 8/2010 | Schimanski et al. |
| 2010/0268491 A1 | 10/2010 | Brink et al. |
| 2010/0284247 A1 | 11/2010 | Manning |
| 2010/0305864 A1 | 12/2010 | Gies |
| 2011/0005835 A1 | 1/2011 | Li |
| 2011/0067928 A1 | 3/2011 | Hulden |
| 2011/0073303 A1 | 3/2011 | Taherian |
| 2011/0164468 A1 | 7/2011 | Robbins et al. |
| 2012/0273270 A1 | 11/2012 | Rasheed |
| 2013/0075157 A1 | 3/2013 | Yang |
| 2013/0075159 A1 | 3/2013 | Yang |
| 2013/0075160 A1* | 3/2013 | Yang .............................. 175/50 |
| 2013/0075161 A1 | 3/2013 | Yang |
| 2013/0080060 A1 | 3/2013 | Yang |
| 2013/0080065 A1 | 3/2013 | Yang |

FOREIGN PATENT DOCUMENTS

| | | |
|---|---|---|
| EP | 2236744 A2 | 10/2010 |
| GB | 2288197 A | 10/1995 |
| WO | 199727502 A1 | 7/1997 |
| WO | 2013049014 | 4/2013 |
| WO | 2013049044 | 4/2013 |
| WO | 2013049111 | 4/2013 |
| WO | 2013049124 | 4/2013 |
| WO | 2013049140 | 4/2013 |
| WO | 2013049158 | 4/2013 |

OTHER PUBLICATIONS

International Search Report and Written Opinion for related PCT Application No. PCT/US2012/057244 dated Sep. 23, 2013.
International Search Report and Written Opinion, PCT/US2012/028994, dated Sep. 4, 2013 (14 pages).
International Search Report and Written Opinion, PCT/US2012/057039, dated Aug. 21, 2013 (12 pages).
International Search Report and Written Opinion, PCT/US2012/057084, dated Aug. 21, 2013 (11 pages).
Office Action for co-pending U.S. Appl. No. 13/554,470 dated Nov. 5, 2014.
Schlumberger "Drillstring" retrieved at http://www.glossary.oilfield.slb.com/en/Terms/d/drillstring.aspx, 2013.
International Search Report and Written Opinion dated Aug. 7, 2013, for related PCT Application PCT/US2012/057274.
International Search Report and Written Opinion dated Aug. 7, 2013, for related PCT Application PCT/US2012/057222.
Vardhan, H., Adhikari, G. R. and Raj, M. G., Estimating Rock Properties Using Sound Levels Produced During Drilling, International Journal of Rock Mechanics & Mining Sciences, (2009), pp. 604-612, vol. 46, Elsevier Ltd., www.elsevier.com/locate/ijrmms.

(56) References Cited

OTHER PUBLICATIONS

Gradi, C., Eustes, A. W. and Thonhauser, G., An Analysis of Noise Characteristics of Drill Bits, Society of Petroleum Engineers, SPE Annual Technical Conference and Exhibition, Sep. 21-24, 2008, paper No. 115987-MS, Denver, CO.

Statoil, A. K., Nakken, E. I., and Baltzersen, O., Characteristics of Drill Bit Generated Noise, Sociiety of Petrophysicists & Well Log Analysts, SPWLA 31st Annual Logging Symposium, (1990), paper No. 1990-X.

Sun, X., A Study of Acoustic Emission in Drilling Applications, American Rock Mechanics Association, The 37th U.S. Symposium on Rock Mechanics (USRMS), Jun. 7-9, 1999, paper No. 99-0983, Vail, CO.

Gao, L., Gardner, W. and Robbins, C., Limits on Data Communication Along the Drillstring Using Acoustic Waves, Society of Petroleum Engineers, SPE Annual Technical Conference and Exhibition, Oct. 9-12, 2005, paper No. 95490-MS, Dallas, TX.

Radtke, R. P., Fontenot, J. E., Glowka, D. A., Stokes, R. H., Sutherland, J., Evans, R., Musser, J. and Ion Geophysical, Inc., Advanced Seismic While Drilling System, United States Department of Energy-Natural Energy Technology Laboratory, Oil & Natural Gas Technology, DOE Award No. DE-FC26-06NT42242, Jun. 2008.

Nakanishi, S., Feasibility Study of Seismic-While Drilling Using Hammer Drilling Technology, Department of Exploration Geophysics, Nov. 1999.

Myers, G., Goldberg, D. and Rector, J., Drill String Vibration: A Proxy for Identifying Lithologic Boundaries While Drilling, Proceeding of the Ocean Drilling Program Scientific Results (Casey and Miller), (2002), pp. 1-17, vol. 179, Palisades NY.

Veeningen, D., Nov-IntelliServ, USA, Describes How Broadband Network Expands Possibilities for Drilling Extend Reach Multilateral Wells, Oilfield Technology, Jun. 2009, www.oilfieldtechnology.com.

GAO, DVL Technology, retrieved at http://chinada-international.com/Tech/e_index.htm on Jul. 18, 2011, 2 pages.

Gwilliam, W. and Radtke, R., Advanced Seismic While Drilling System, Oil & Natural Gas Projects, Exploration & Production Technologies, DE-FC26-04NT42242, Technology International, Inc., Kingwood, TX, Sep. 30, 2006.

Notice of Allowance for co-pending U.S. Appl. No. 13/554,470 dated Mar. 2, 2015.

Office Action for co-pending U.S. Appl. No. 13/553,958 dated Apr. 16, 2015.

Office Action for co-pending U.S. Appl. No. 13/554,298 dated Feb. 26, 2015.

European Examination Report for Application No. 12783703.7; dated Jan. 20, 2017; (pp. 1-6).

Notice of Allowance for co-pending U.S. Appl. No. 13/554,298 dated Oct. 29, 2015; 14 pages.

Office Action for co-pending U.S. Appl. No. 13/553,958 dated Dec. 17, 2015; 30 pages.

Schlumberger "Drillpipe" retrieved at http://www.glossary.oilfield.slb.com/en/Terms/d/drillpipe.aspx, 2013.

International Search Report and Written Opinion issued in related PCT Patent Application No. PCT/US2012/057039; dated Aug. 21, 2013; 12 pages.

International Search Report and Written Opinion issued in related PCT Patent Application No. PCT/US2012/057084; dated Aug. 21, 2013; 11 pages.

Non-Final Office Action issued in U.S. Appl. No. 13/554,369 dated Aug. 16, 2017; 14 pgs.

Non-Final Office Action issued in U.S. Appl. No. 15/233,541 dated Sep. 22, 2017; 10 pgs.

\* cited by examiner ns position between the upper and lower boundaries of the pay zone. The conventional borehole acoustic telemetry system, which transmits data at low rate (at about tens bit per second), is employed to transmit the measured data to surface.
APPARATUS, COMPUTER READABLE MEDIUM, AND PROGRAM CODE FOR EVALUATING ROCK PROPERTIES WHILE DRILLING USING DOWNHOLE ACOUSTIC SENSORS AND TELEMETRY SYSTEM

RELATED APPLICATIONS

This application is a non-provisional of and claims priority to and the benefit of U.S. Provisional Patent Application No. 61/539,242 titled "Apparatus And Program Product For Evaluating Rock Properties While Drilling Using Downhole Acoustic Sensors And Telemetry System." filed on Sep. 26, 2011, and is related to U.S. patent application Ser. No. 13/554,369, filed on Jul. 20, 2012, titled "Methods of Evaluating Rock Properties While Drilling. Using Downhole Acoustic Sensors and a Downhole Broadband Transmitting System"; U.S. patent application Ser. No. 13/553, 958, filed on Jul. 20, 2012, titled "Methods of Evaluating Rock Properties While Drilling Using Downhole Acoustic Sensors and Telemetry System"; U.S. patent application Ser. No. 13/554,298, filed on Jul. 20, 2012, titled "Apparatus for Evaluating Rock Properties While Drilling Using Drilling Rig-Mounted Acoustic Sensors"; and U.S. patent application Ser. No. 13/554,470, filed on Jul. 20, 2012, titled "Methods for Evaluating Rock Properties While Drilling Using Drilling Rig-Mounted Acoustic Sensors"; U.S. patent application Ser. No. 13/554,077, filed on Jul. 20, 2013, titled "Apparatus, Computer Readable Medium, and Program Code For Evaluating Rock Properties While Drilling Using Downhole Acoustic Sensors and a Downhole Broadband Transmitting System; U.S. Provisional Patent Application No. 61/539,246 titled "Methods Of Evaluating Rock Properties While Drilling Using Downhole Acoustic Sensors And Telemetry System," filed on Sep. 26, 2011; U.S. Provisional Patent Application No. 61/539,201, titled "Apparatus For Evaluating Rock Properties While Drilling Using Drilling Rig-Mounted Acoustic Sensors," filed on Sep. 26, 2011; U.S. Provisional Patent Application No. 61/539,213, titled "Methods For Evaluating Rock Properties While Drilling Using Drilling Rig-Mounted Acoustic Sensors," filed on Sep. 26, 2011; U.S. Provisional Patent Application No. 61/539,165, titled "Apparatus And Program Product For Evaluating Rock Properties While Drilling Using Downhole Acoustic Sensors And A Downhole Broadband Transmitting System," filed on Sep. 26, 2011, and U.S. Provisional Patent Application No. 61/539,171, titled "Methods Of Evaluating Rock Properties While Drilling Using Downhole Acoustic Sensors And A Downhole Broadband Transmitting System," filed on Sep. 26, 2011; each incorporated herein by reference in its entirety.

BACKGROUND OF THE INVENTION

1. Field of the Invention

This invention relates in general to hydrocarbon production, and more particularly, to identifying rock types and rock properties in order to improve or enhance drilling operations.

2. Description of the Related Art

Measuring rock properties during drilling in real time can provide the operator the ability to steer a drill bit in the direction of desired hydrocarbon concentrations. In current industrial practice and prior inventions, either resistivity or sonic logging while drilling (LWD) tools are employed to guide the drill bit during horizontal or lateral drilling. The center of these techniques is to calculate the locations of the boundary between the pay zone and the overlying rock (upper boundary), and the boundary between the pay zone and underlying rock at the sensors location. The drill bit is steered or maintained within the pay zone by keeping the drill string, at the sensors position, in the middle, or certain position between the upper and lower boundaries of the pay zone. The conventional borehole acoustic telemetry system, which transmits data at low rate (at about tens bit per second), is employed to transmit the measured data to surface.

Since the sensors are located 30-50 feet behind the drill bit, theses conventional LWD steering tools only provide data used in steering the drill bit 30-50 feet behind the drill bit. As the result, it is only after the 30-50 feet that the operator finds out if the selected drilling path is or is not the desired one. Therefore, these tools are not true real-time tools.

Some newer types of systems attempt to provide data at the drill bit, at real-time, while still utilizing conventional borehole telemetry systems (having a relatively slow bit rate). Such systems, for example, are described as including a downhole processor configured to provide downhole on-site processing of acoustic data to interpret the lithologic properties of the rock encountered by the drill bit through comparison of the acoustic energy generated by the drill bit during drilling with predetermined bit characteristics generated by rotating the drill bit in contact with a known rock type. The lithologic properties interpreted via the comparison are then transmitted to the surface via the conventional borehole telemetry system. Although providing data in a reduced form requiring only a bit rate speed, as such systems do not provide raw data real-time which can be used for further analysis, it is nearly impossible to construct additional interpretation models or modify any interpretation models installed on the downhole processor.

Some newer types of borehole data transmitting systems utilize a dedicated electronics unit and a segmented broadband cable protected by a reinforced steel cable positioned within the drill pipe to provide a much faster communication capability. Such systems have been employed into conventional LWD tools to enhance the resolution of the logged information. However the modified tools still measures rock properties at the similar location which is 30-50 feet behind the drill bit.

Accordingly, recognized by the inventor is the need for apparatus and program code for identifying rock properties in real-time during drilling, and more particularly, apparatus having acoustic sensors adjacent the drill bit positioned to detect drill sounds during drilling operations, a downhole computer/processor positioned to receive raw acoustic sensor data and to process the raw acoustic sensor data to determine acoustic characteristics, a telemetry system for pushing acoustic feature data to a surface computer and the computer/processor positioned to receive the acoustic characteristics data to derive the rock type and to evaluate the properties of the rocks in real-time. Recognized by the inventor is that the acoustic characteristics data would require a reduced bandwidth, sufficient enough to allow use of conventional bit-rate borehole telemetry systems, yet still hold important information previously considered available only through access to raw acoustic sensor data.

SUMMARY OF THE INVENTION

In view of the foregoing, various embodiments of the present invention advantageously provide apparatus and program code for identifying rock types and rock properties of rock that is currently in contact with an operationally employed drilling bit, which can be used in real-time steering of the drilling bit during drilling. Various embodiments of the present invention provide apparatus having acoustic sensors adjacent the drill bit positioned to detect drill sounds during drilling operations, a downhole computer/processor positioned to receive raw acoustic sensor data and to process the raw acoustic sensor data to determine acoustic characteristics, a telemetry system for pushing acoustic characteristics data to a surface computer, and surface computer/processor positioned to receive the acoustic characteristics data to derive the rock type and to evaluate the properties of the rocks in real-time. Advantageously, the acoustic characteristics can be used to identify the lithology type of the rocks encountered by the drill bit, to determine the formation boundary, etc. The acoustic characteristics can advantageously also be used in conjunction with petrophysical properties of formation rock samples to derive a petrophysical properties evaluation algorithm, which can be used to predict the petrophysical properties from the acoustics characteristics.

The acoustic characteristics data (e.g., mean frequency, normalized deviation of frequency, mean amplitude, normalized deviation of amplitude, and/or apparent power) derived from the raw acoustic sensor data by the downhole computer/process, has a relatively small size, but nevertheless advantageously describes the raw acoustic sensor data to an extent that the acoustic characteristics data, itself, can be considered a form of raw data. The acoustics characteristics data advantageously requires a reduced bandwidth over that of typical raw acoustic sensor data, sufficient enough to allow use of conventional downhole telemetry systems, such as, for example, a mud pulse telemetry system, yet still holds sufficient acoustic information for the surface computer to determine lithology type, to identify formation boundaries, and to determine an optimal location of the casing shoe, among other applications, directly from the acoustic characteristics contained in the acoustic characteristics data.

The acoustic characteristics data, according to various embodiments of the present invention, is advantageously also sufficient for the surface computer to identify petrophysical properties utilizing a petrophysical properties evaluation algorithm capable of receiving the acoustic characteristics as input data and/or sufficient for the surface computer to generate the petrophysical properties evaluation algorithm utilizing acoustic characteristics data and correspondent petrophysical properties of formation rock samples, and sufficient for the surface computer to construct additional interpretation models or modify any prior generation of interpretation models generated by the surface computer.

More specifically, an example of an embodiment of an apparatus for identifying rock properties of rocks in real-time during operational drilling (to include identifying lithology type and other petrophysical properties), can include both conventional components and additional/enhanced acoustic components. Some primary conventional components of the apparatus include a drill string including a plurality of drill pipes each having an inner bore, a drill bit connected to the downhole end of the drill string, a top drive system for rotating the drill string having both rotating and stationary portion, and a borehole telemetry system. The additional/acoustic components of the apparatus can include a downhole sensor subassembly connected to and between the drill bit and the drill string, acoustic sensors (e.g. accelerometer, measurement microphone, contact microphone, hydrophone) attached to or contained within the downhole sensor subassembly adjacent the drill bit and positioned to detect drill sounds during drilling operations.

The apparatus can also include a downhole processor assembly operably coupled to the acoustic sensors and a surface computer operably coupled to the downhole computer/processor via a downhole data transmitting interface, a surface data transmitting interface, and the borehole telemetry system providing a communication pathway therebetween.

According to an embodiment of the apparatus, the downhole processor assembly includes a programmable processor including a processor (processing subsection), memory contained within, carried by, or otherwise operably coupled with the processor, and an acoustics characteristics evaluation program (e.g., firmware) stored in the memory, which can adapt the downhole processor assembly to perform various operations. The operations can include, for example, receiving raw acoustic sensor data from the acoustic sensors, processing the raw acoustic sensor data to include, for example, employing an acoustics characteristics evaluation algorithm to thereby derive acoustic characteristics (e.g., mean frequency, normalized deviation of frequency, mean amplitude, normalized deviation of amplitude, and apparent power) from the raw acoustic sensor data. The operation of processing the raw acoustic sensor data can include sampling and converting analog acoustic sensor signals into digitized data through employment of an data acquisition unit, transforming the digitized data into Fast Fourier Transform data using a Fast Fourier transformation, optionally filtering the Fast Fourier Transform data, and deriving the acoustic characteristics from the filtered Fast Fourier Transform data.

According to an embodiment of the acoustics characteristics evaluation algorithm, the algorithm evaluates the filtered Fast Fourier Transform data for acoustic characteristics. The acoustic characteristics can include the mean frequency, normalized deviation of frequency, mean amplitude, normalized deviation of amplitude and apparent power, identified above. These characteristics can be predetermined for rock samples having known lithology types and/or petrophysical properties, and thus, can be used, for example, by a surface computer to identify lithology type and other properties by comparing such characteristics of the acoustic data received during drilling to that determined for the rock samples.

According to an embodiment of the apparatus, the downhole data transmitting interface includes a binary data encoder to encode the acoustic characteristics data, operably coupled with the borehole telemetry system, which provides a communications medium for the encoded binary data. Similarly, the surface data transmitting interface includes a binary data decoder to decode the encoded acoustics characteristics data, operably coupled with the borehole telemetry system.

According to an embodiment of the apparatus, the surface computer includes a processor, memory in communication with the processor, and a petrophysical properties evaluation program, which can adapt the computer to perform various operations. The operations can include, for example, receiving acoustic characteristics data from the downhole data transmitting interface. According to an exemplary configuration, these acoustic characteristics can be predetermined for rock samples having known lithology types and/or petrophysical properties. Accordingly, the operations can also include receiving the predetermined acoustic characteristics, comparing such characteristics of the acoustic data received during drilling to that determined for the rock samples, and deriving lithology type and other properties responsive to the operation of comparing. According to another embodiment of the petrophysical properties evaluation program, the computer uses the acoustic characteristics to perform the operation of determining formation boundaries based on real-time detection of changes in the lithology type of the rocks being drilled and/or petrophysical properties thereof, along with the operation of determining an optimal location of the casing shoe, among other operations, real-time, from the acoustic characteristics data.

According to an exemplary configuration, the operations can also include employing a petrophysical properties evaluation algorithm to thereby derive petrophysical properties of rocks undergoing drilling, real-time, from the acoustic characteristics data. The petrophysical properties can include lithology type, porosity, presence of fracture, presence of hydrocarbons, etc. According to an exemplary configuration, the petrophysical properties program or separate program code employs one or more variations of an algorithm development algorithm to derive a "bit specific" or "bit independent" petrophysical properties evaluation algorithm by evaluating acoustic characteristics of samples having known properties. Similarly, the derived bit specific or bit independent petrophysical properties evaluation algorithm evaluates the real-time acoustic characteristics data for petrophysical properties. This petrophysical property data can advantageously be applied by applications to include formation boundary determination, casing shoe position fine-tuning, etc. The petrophysical properties can beneficially be evaluated substantially continuously during drilling in real-time in order to apply the evaluated petrophysical properties to steer drill bit in real-time.

According to an embodiment of the present invention, the acoustics characteristics evaluation program (e.g., firmware) can be provided either as part of the apparatus or as a standalone deliverable. As such, the acoustics characteristics evaluation program can include a set of instructions, stored or otherwise embodied on a non-transitory computer readable medium, that when executed by a processor(s), cause the processor(s) to perform various operations. These operations can include receiving raw acoustic sensor data from one or more, but more typically a plurality of acoustic sensors positioned adjacent an operationally employed drill bit. The operations can also include deriving a plurality of acoustic characteristics including, for example, mean frequency, normalized deviation of frequency, mean amplitude, normalized deviation of amplitude, and/or apparent power, among others, from the raw acoustic sensor data. The operations can also include forming a Fast Fourier Transform to form Fast Fourier Transform data, optionally filtering the Fast Fourier Transform data, and deriving the acoustic characteristics from the filtered Fast Fourier Transform data.

Similarly, according to an embodiment of the present invention, the petrophysical properties evaluation program can be provided either as part of the apparatus or as a standalone deliverable. As such, the petrophysical properties evaluation program can include a set of instructions, stored or otherwise embodied on a non-transitory computer readable medium, that when executed by a computer, cause the computer to perform various operations. These operations can include, for example, the operation of receiving acoustic characteristics data from a surface data transmitting interface in communication with a communication medium that is further in communication with a downhole data transmitting interface operably coupled to a downhole processor, operably coupled to a plurality of acoustic sensors. The operations can also include processing the acoustics characteristics data using one or more applications to thereby derive/identify various properties of rocks undergoing drilling, real-time, and/or deriving petrophysical properties from the acoustics characteristics data utilizing a derived petrophysical properties evaluation algorithm employable to predict one or more petrophysical properties of rocks undergoing drilling.

According to an embodiment of the petrophysical properties evaluation program, the operation of processing the acoustics characteristics data can include comparing the mean frequency, the normalized deviation of frequency, the mean amplitude, the normalized deviation of amplitude, and/or apparent power, of the rocks undergoing drilling with the corresponding acoustic characteristics of a plurality of rock samples having different known lithologies according to a first configuration, or comparing only the mean frequency and the normalized deviation of frequency of the rock undergoing drilling with the mean frequency and normalized deviation of frequency of a plurality of rock samples having different known lithologies according to another configuration. The operations can also include identifying lithology type of the rocks undergoing drilling, determining a location of a formation boundary encountered during drilling, and/or identifying an ideal location for casing shoe positioning, among others. According to an exemplary implementation, the mean frequency and normalized deviation of frequency are examined together to determine an amount of correlation of the acoustic characteristics associated with the rocks undergoing drilling and the acoustic characteristics associated with the rock samples. The operation of comparing can beneficially be performed substantially continuously during drilling. The result from the comparison can advantageously be applied by applications to include real-time lithology type identification, drill bit steering in order to provide enhanced steering ability, formation boundary determination, casing shoe position determination, etc.

According to an embodiment of the petrophysical properties evaluation program employing a bit-specific evaluation methodology, the operation of deriving petrophysical properties from the acoustics characteristics data can include deriving a bit-specific petrophysical properties evaluation algorithm. The derivation of the algorithm can include collecting petrophysical properties data describing one or more petrophysical properties of rock for a plurality of formation rock samples and correspondent acoustic characteristics data for a preselected type of drill bit, and determining one or more relationships between features of the acoustic characteristics data and correspondent one or more petrophysical properties of rock describing petrophysical properties of a plurality of formation rock samples. This can be accomplished, for example, by utilizing mathematical modeling techniques such as, multiple regression analysis, artificial neural network modeling, etc. The derivation of the algorithm can also include coding the determined relationships into computer program code defining the bit-specific petrophysical properties evaluation algorithm. The operations can correspondingly include employing the derived petrophysical properties evaluation algorithm to predict one or more petrophysical properties of the rocks undergoing drilling real-time responsive to acoustics characteristics data produced in response to the drilling.

According to another embodiment of the petrophysical properties evaluation program employing a bit-independent evaluation methodology, the bit-independent petrophysical properties evaluation algorithm derivation can also or alternatively include collecting petrophysical properties data describing one or more petrophysical properties of rocks for a plurality of formation rock samples and correspondent acoustic characteristics data for a plurality of different types of drill bits, and determining one or more relationships between the acoustic characteristics data and correspondent one or more petrophysical properties of rocks, e.g., using mathematical modeling techniques, such as, for example, artificial neural network modeling, etc., to provide a bit-independent evaluation methodology. The algorithm derivation can also include coding the determined relationships into computer program code defining a bit-independent petrophysical properties evaluation algorithm. The operations can correspondingly include employing the derived petrophysical properties evaluation algorithm to predict one or more petrophysical properties of the rocks undergoing drilling real-time responsive to the acoustic characteristics data produced in response to the drilling.

According to various embodiments of the present invention, methods of evaluating properties of rock in a formation in real-time during drilling are also provided. For example, various embodiments of the methods include both computer employable steps (operations) as described with respect to the operations performed by the apparatus/program, along with various non-computer implemented steps which provide substitutable replacements for the featured computer implemented steps, in conjunction with additional non-computer implemented steps as described below and/or as featured in the appended claims. Examples of various embodiments of the method are described below.

According to an embodiment of a method of evaluating properties of rock in a formation in real-time during drilling, the method can include the steps of providing a downhole sensor subassembly, a downhole processor assembly, an acoustics characteristics evaluation program (e.g., firmware), a downhole data transmitting interface, a surface data transmitting interface, a surface computer, and a petrophysical properties evaluation program.

The method can also include connecting the downhole sensor subassembly between a drill string and a drill bit for drilling rock. The downhole sensor subassembly can contain or carry at least one, but more typically a plurality of acoustic sensors such as, for example, accelerometers, measurement microphones, contact microphones, hydrophones, among others. According to an exemplary configuration, the acoustic sensors are contained within the downhole sensor subassembly adjacent the drill bit and positioned to detect drill sounds during drilling operations. According to an exemplary configuration, the downhole sensor subassembly can contain or carry the downhole processor assembly. The downhole processor assembly can include a processor, memory contained within, carried by, or otherwise operably coupled with the processor, and the acoustics characteristics evaluation program, which can adapt the processor to perform various operations.

The method can also include operably coupling the downhole processor assembly to the acoustic sensors to receive and process real-time raw acoustic sensor data associated with the contact of the drill bit with rocks during operational drilling, and operably coupling the downhole processor assembly to the surface computer to receive and process acoustic characteristics data generated by the downhole processor assembly. According to an exemplary configuration, the operation of coupling the downhole processor assembly to the surface computer includes operably coupling the downhole data transmitting interface, operably coupling the downhole data transmitting interface to a borehole telemetry system, and operably coupling the surface data transmitting interface to the surface computer.

According to an exemplary configuration, the downhole data transmitting interface includes a binary data encoder to encode the acoustic characteristics data, operably coupled with the borehole telemetry system, which provides a communications medium for the encoded binary data. Similarly, the surface data transmitting interface includes a binary data decoder to decode the encoded acoustics characteristics data, operably coupled with the borehole telemetry system. According to an exemplary configuration, the surface computer includes a processor, memory in communication with the processor, and a petrophysical properties evaluation program, which can adapt the computer to perform various petrophysical properties identification and/or derivation operations.

According to an embodiment of the method, the steps can include, for example, receiving raw acoustic sensor data from the acoustic sensors by the downhole processor assembly, and processing the raw acoustic sensor data to include, for example, deriving a frequency distribution of the acoustic data from the raw acoustic data and/or deriving acoustic characteristics (e.g., mean frequency, normalized deviation of frequency, mean amplitude, normalized deviation of amplitude, and/or apparent power, among others) from the raw acoustic sensor data. The step of processing the raw acoustic sensor data can include sampling and converting analog acoustic sensor signals into digitized data through employment of an data acquisition unit, transforming the digitized data into Fast Fourier Transform data using a Fast Fourier Transformation, optionally filtering the Fast Fourier Transform data, and deriving the acoustic characteristics from the filtered Fast Fourier Transform data.

According to an embodiment of the method, the acoustics characteristics evaluation algorithm can be employed to derive the acoustic characteristics. According to an exemplary configuration, the algorithm evaluates the filtered Fast Fourier Transform data for acoustic characteristics. The acoustic characteristics can include the mean frequency, normalized deviation of frequency, mean amplitude, normalized deviation of amplitude, and/or apparent power, among others, as noted above. These characteristics can advantageously be predetermined for rock samples having known lithology types and/or petrophysical properties, and thus, can be used, for example, by the surface computer to identify lithology type and other properties by comparing such characteristics of the acoustic data received during drilling to that determined for the rock samples.

According to an embodiment of the method, the steps can include, for example, the surface computer retrieving or otherwise receiving predetermined acoustic characteristics predetermined for rock samples having known lithology types and/or petrophysical properties, receiving real-time acoustic characteristics data from the downhole data transmitting interface, comparing the received real-time acoustic characteristics data indicating acoustic characteristics of rock being encountered by the drill bit to the predetermined acoustic characteristics determined for the rock samples, and deriving lithology type and other properties responsive to the step of comparing. The steps can also include determining formation boundaries and/or determining an optimal location of a casing shoe for the casing associated with the drilling string based on real-time detection of changes in the lithology type of the rock being drilled and/or petrophysical properties thereof.

According to an exemplary configuration, the step of comparing can include comparing the mean frequency, the normalized deviation of frequency, the mean amplitude, the normalized deviation of amplitude, and/or apparent power, of the rocks undergoing drilling with the corresponding acoustic characteristics of a plurality of rock samples having different known lithologies according to a first configuration, or comparing only the mean frequency and the normalized deviation of frequency of the rock undergoing drilling with the mean frequency and normalized deviation of frequency of a plurality of rock samples having different known lithologies according to another configuration. According to an exemplary implementation, the mean frequency and normalized deviation of frequency are examined together to determine an amount of correlation of the acoustic characteristics associated with the rocks undergoing drilling and the acoustic characteristics associated with the rock samples. Also or alternatively, the mean frequency and the mean amplitude can be examined together and/or with normalized deviation of frequency, normalized deviation of amplitude, and/or apparent power, or a combination thereof. The step of comparing can beneficially be performed substantially continuously during drill bit steering in order to provide enhanced steering ability.

According to an embodiment of the method, the steps can also include deriving petrophysical properties of rocks undergoing drilling, real-time, from the acoustic characteristics data. According to an exemplary configuration, the petrophysical properties program or separate program code stored in the memory of the surface computer employs one or more variations of an algorithm development algorithm to derive a "bit specific" or "bit independent" petrophysical properties evaluation algorithm by evaluating acoustic characteristics of samples having known properties. Similarly, the derived bit specific or bit independent petrophysical properties evaluation algorithm evaluates the acoustic characteristics data for petrophysical properties. This petrophysical property data can advantageously be applied by applications to include drill bit steering, formation boundary determination, casing shoe position fine-tuning, etc.

According to an embodiment of the method employing a bit-specific evaluation methodology, the step of deriving petrophysical properties from the acoustic characteristics data can include deriving a bit-specific petrophysical properties evaluation algorithm for use in evaluating the received signals. The derivation of the algorithm can include collecting petrophysical properties data describing one or more petrophysical properties of rocks for a plurality of formation rock samples and correspondent acoustic characteristics data for a preselected type of drill bit. The algorithm derivation can also include determining one or more relationships between the acoustics characteristics data and correspondent one or more petrophysical properties of rock describing petrophysical properties of the plurality of formation rock samples, e.g., utilizing mathematical modeling techniques such as, multiple regression analysis, artificial neural network modeling, etc. The algorithm derivation can also include coding the determined relationships into computer program code defining the bit-specific petrophysical properties evaluation algorithm. The derived algorithm can then be used in predicting one or more petrophysical properties of the rocks undergoing drilling real-time responsive to acoustic characteristics data describing acoustic characteristics of an acoustic signal produced in response to the drilling.

According to an embodiment of the method employing a bit-independent evaluation methodology, the step of deriving petrophysical properties from the acoustic characteristics data can also or alternatively include deriving a petrophysical properties evaluation algorithm. The derivation of the algorithm can include collecting petrophysical properties data describing one or more petrophysical properties of rocks for a plurality of formation rock samples and correspondent acoustic characteristics data for a plurality of different types of drill bits. The algorithm derivation can also include determining one or more relationships between the acoustic characteristics data and correspondent one or more petrophysical properties of the rock, e.g., using mathematical modeling techniques, artificial neural network modeling, etc., to provide a bit-independent evaluation methodology. The algorithm derivation can also include coding the determined relationships into computer program code defining bit-independent petrophysical properties evaluation algorithm. Correspondingly, the method can include employing the derived petrophysical properties evaluation algorithm to predict one or more petrophysical properties of the rock undergoing drilling real-time responsive to acoustic characteristics data describing acoustic characteristics of an acoustic signal produced in response to the drilling.

Various embodiments of the present invention advantageously supply a new approach for a much better drilling steering. Various embodiments of the present invention provide apparatus and methods that supply detailed information about the rock that is currently in contact with the drilling bit, which can be used in real-time steering the drilling bit. That is, various embodiments of the present invention advantageously provide an employable methodology of retrieving a sufficient level of information so that the driller always knows the rock he is drilling, so that the drilling bit can be steered to follow the desire path more accurately than conventionally achievable. In comparison with conventional drilling steering tools, the real-time data provided by various embodiments of the present invention advantageously allow the driller to drill smoother lateral or horizontal wells with better contact with the production zone, detection of formation boundaries, and detection of the fractured zones, which can advantageously result in better well production, and further analysis on raw sensor data, if necessary.

According to various embodiments of the present invention, in the borehole, recorded acoustic data is processed for its acoustic characteristics (mean frequency, normalized deviation, etc.), not interpreted for lithological properties, which would require extra resources. Acoustic features that preserve information contained in a recorded acoustic data, but at a much lower bandwidth requirement, are then transmitted to surface by a borehole telemetry system. An interpretation model of acoustic signals-to-lithological properties to derive petrophysical properties is located in a computer on surface, where additional resources are available. Advantageously, as the raw data is essentially available at the surface, albeit in a reduced form, according to this exemplary implementation, is easy to construct and modify the interpretation model, as necessary.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

DETAILED DESCRIPTION

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout. Prime notation, if used, indicates similar elements in alternative embodiments.

When drilling into different lithologies or the same lithology with different properties (e.g., porosity, water saturation, permeability, etc.) the generated acoustic sounds emanating from the drill bit when drilling into rock, are distinctly different. The sounds, termed as drilling acoustic signals hereafter, transmit upward along the drill string. According to various embodiments of the present invention, a downhole sensor subassembly containing acoustic sensors is positioned above the drill bit and connected to the above drill string. The drilling acoustic signals transmit from the drill bit to the downhole sensor subassembly and are picked up by the acoustic sensors. The drilling acoustic signals received by the sensors are transmitted (e.g., after amplification) to a processor/processor assembly where they can be firstly transformed by using a Fast Fourier Transformation (FFT) to generate FFT data. The processor can evaluate acoustic characteristics, such as mean frequency, normalized deviation of the frequency, mean amplitude, etc. of the acoustic signals from the FFT data. The derived acoustic characteristics can be transmitted to the surface by using a borehole telemetry system, which can include various components such as, for example, a downhole data interface, an electrical/acoustic/wireless medium, a surface data interface, etc. On the surface, the lithology type and petrophysical properties of the rock under drilling are derived from the acoustic characteristics of the drilling acoustic signals.

Where conventional measurement-while-drilling tools are typically located 30 to 50 feet behind the drill bit, beneficially, a major advantage of approaches employed by various embodiments of the present invention is that such approaches can derive information about lithologies from a position located at the cutting surface of the drill bit to provide such information to the operator steering the drill bit, in real time. This advantage makes aspects of various embodiments of the present invention ideal in the application of horizontal and lateral well drill steering, locating the relative position for setting the casing shoe, detecting fractured zones, and interpreting rock lithologies and petrophysical properties.

Figure 1:
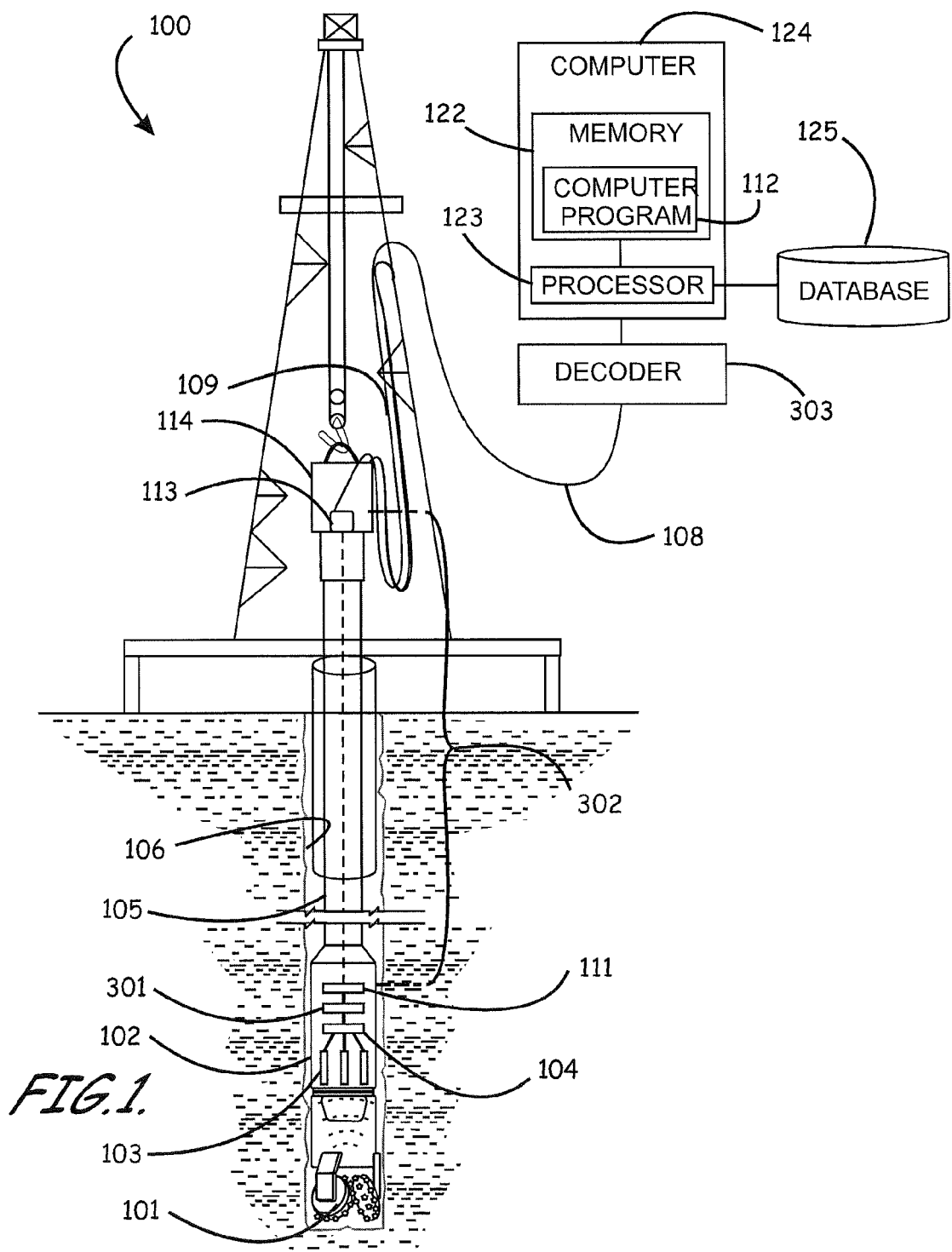
FIG. 1 is a partial perspective view and partial schematic diagram of a general architecture of an apparatus for identifying rock properties in real-time during drilling according to an embodiment of the present invention.
Figure 2:
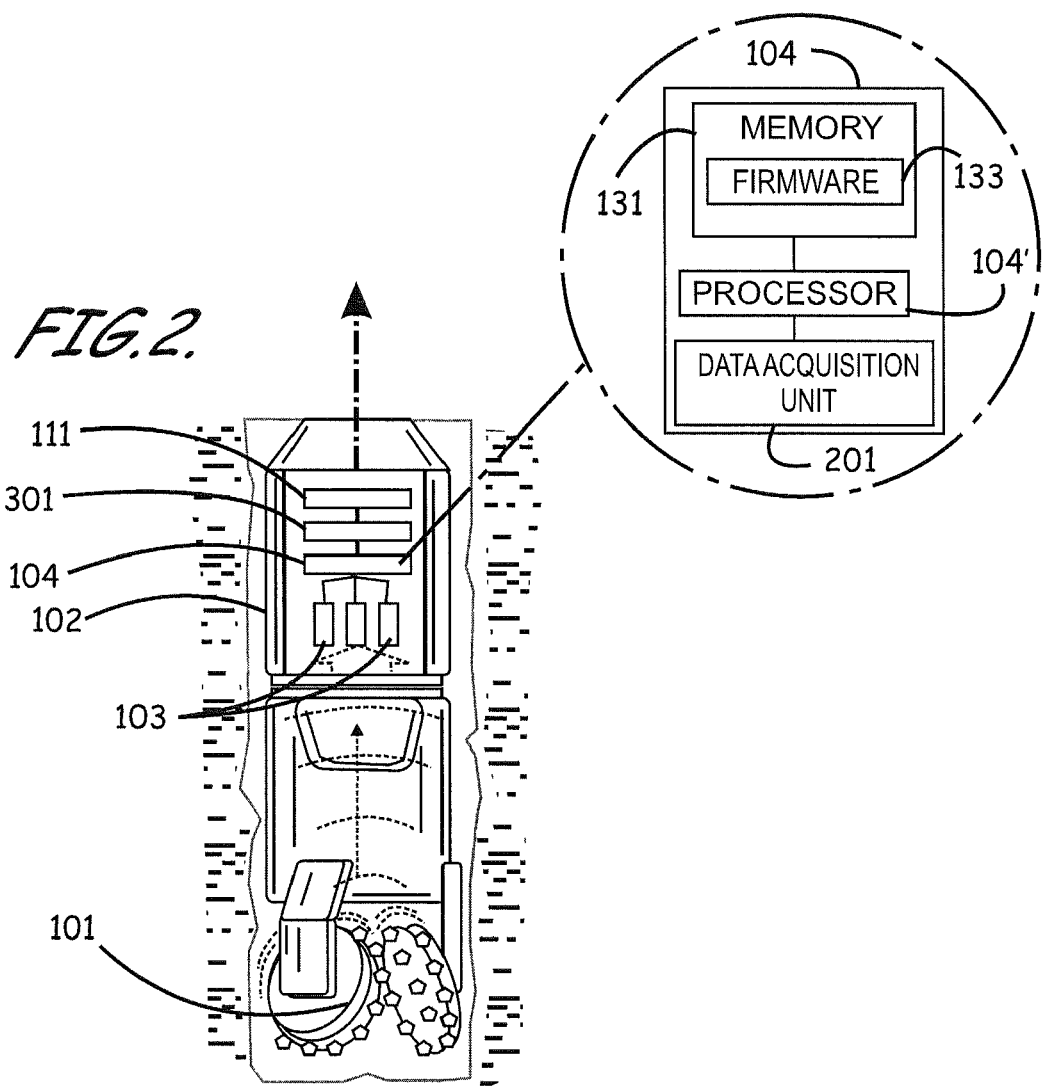
FIG. 2 is a partial perspective view and partial schematic diagram of a downhole sensor subassembly connected to a drill bit assembly according to an embodiment of the present invention.

FIGS. 1-2 schematically show the setup of an exemplary apparatus for identifying rock properties in real-time during drilling 100. To provide downhole drilling acoustic signal recording, acoustic sensors 103 are connected to a processor/processor assembly 104. According to the exemplary configuration, both are contained in a downhole sensor subassembly 102, which is positioned above a drill bit 101 and connected to a drill string 105. In operation, the drilling acoustic signals are generated when the drill bit 101 bites rocks at the bottom of a borehole 106 during the drilling process.

Different acoustic sensors 103 may be used, e.g. accelerometer, measurement microphone, contact microphone, and hydrophone. According to the exemplary configuration, at least one, but more typically each acoustic sensor 103 either has a built-in amplifier or is connected to an amplifier (not shown) directly. The drilling acoustic signals picked up by the acoustic sensors 103 are amplified first by the amplifier and are then transmitted to the processor/processor assembly 104.

Figure 3:
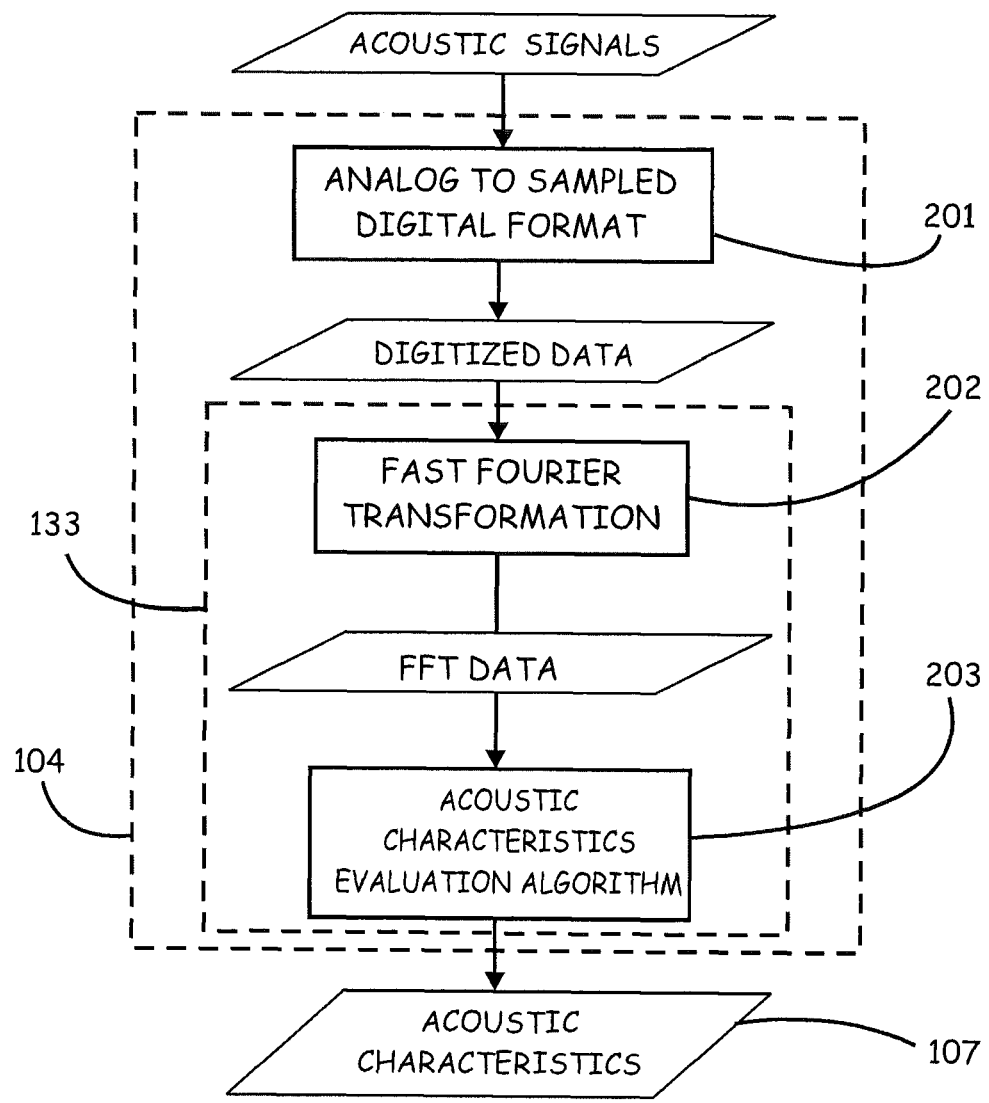
FIG. 3 is a schematic diagram illustrating major components of a data process module according to an embodiment of the present invention.

FIGS. 2 and 3 illustrates high-level components and functions of processor/processor assembly 104. According to an exemplary configuration, the processor/processor assembly 104 comprises a programmable electronic processor 104'. Other configurations are, however, within the scope of the present invention. The processor/processor assembly 104 can include various components such as, for example, a data acquisition unit at 201, the electronic processor 104', memory 131 contained within, carried by, or otherwise operably coupled with the electronic processor 104', and an acoustics characteristics evaluation program/firmware 133 stored therein; which can adapt the processor/processing assembly 104 to perform program functions.

Referring to FIG. 3, according to an exemplary configuration, when the processor/processor assembly 104 receives the amplified acoustic signals from the acoustic sensors 103, the data acquisition unit at 201 samples the acoustic signals and then converts the sampled analog data signal into digital format. The digitized data is then transformed using a Fast Fourier Transform (FFT) 202 into FFT data. An acoustic characteristics evaluation algorithm 203 evaluates the FFT data for acoustic characteristics 107, such as, for example, mean frequency, normalized deviation of frequency, mean amplitude, normalized deviation of amplitude, apparent power etc. Some low frequency or low amplitude data points for a sampled frequency distribution (FFT data) may be filtered out before performing the acoustic characteristics evaluation for the acoustic characteristics 107 using filtering techniques if they are generated, for example, from other sources, i.e. not from the bit cutting into the rocks. According to an embodiment of the processor/processor assembly 104, the acoustic characteristics evaluation program/firmware 133 performs the FFT transformation 202 and incorporates the acoustic characteristics evaluation algorithm 203. Alternatively, various hardware components as understood by those of ordinary skill in the art, can perform such functions.

According to the exemplary configuration, an acoustic characteristics evaluation algorithm 203 evaluates the filtered FFT data for select acoustic characteristics, such as, for example, mean frequency, normalized deviation of frequency, mean amplitude, normalized deviation of amplitude, apparent power. These acoustic characteristics for an acoustic signal sample are defined as follows:

$$\mu_f = \frac{\sum_{i=1}^{n} A_i \cdot f_i}{\sum_{i=1}^{n} A_i} \quad (1)$$

$$\sigma_{f\_N} = \frac{1}{\mu_f}\sqrt{\sum_{i=1}^{n}\frac{A_i}{\sum_{i=1}^{n}A_i}(f_i-\mu_f)^2} \quad (2)$$

$$\mu_A = \frac{1}{n}\sum_{i=1}^{n}A_i \quad (3)$$

$$\sigma_{A\_N} = \frac{1}{\mu_A}\sqrt{\frac{1}{n}\sum_{i=1}^{n}(A_i-\mu_A)^2} \quad (4)$$

$$P_a = \sum_{i=1}^{n}A_i^2 f_i^2 \quad (5)$$

wherein:
$\mu_f$—mean frequency, Hz,
$\sigma_{f\_N}$—normalized deviation of frequency, Hz,
$\mu_A$—mean amplitude, the unit depending on the type of acoustic sensor used in the measurement,
$\sigma_{A\_N}$—normalized deviation of amplitude, the unit depending on the type of acoustic sensor used in the measurement,
Pa—apparent power, the unit depending on the type of acoustic sensor used in the measurement,
$f_i$—frequency of the $i^{th}$ point of the acoustic signal sample, Hz,
$A_i$—amplitude of the $i^{th}$ point of the acoustic signal sample, the unit depending on the type of acoustic sensor used in the measurement, and
n—number of data points of the acoustic signal sample.

The mean frequency and the normalized deviation of frequency characterize the frequency distribution, while the mean amplitude and the normalized deviation of amplitude characterize the loudness level of the drilling sound. Apparent power represents the power of the acoustic signals. In the evaluation, these characteristics can be calculated within the whole range or a partial range of the frequency of acoustic samples of the acoustic signal. The range is selected to achieve the maximum difference of these characteristics among different lithologies.

The data size of the derived acoustic characteristics 107 is small enough to be transmitted to the surface by using a borehole telemetry system 302 (in FIG. 1). Borehole telemetry systems typically have a limited bandwidth capability. As such, the raw recorded acoustic sensor data would be too large to be transmitted to the surface using such systems, even after data compaction. After characterization treatment, for an acoustic sample, there are relatively few data points (e.g., five data points if only mean frequency, normalized deviation of frequency, mean amplitude, normalized deviation of amplitude, and apparent power, are used). Accordingly, the bandwidth requirement of the derived acoustic characteristics data is relatively small with respect to the raw acoustic sensor data and is well within the limits of the typical borehole telemetry system, negating a need to modify or replace existing telemetry systems currently in use in order to accommodate the provision of real-time acoustic information sufficient to be used to interpret lithology type or petrophysical properties of rock engaging the drill bit 101 to thereby provide for real-time drilling applications (e.g., real-time steering, formation boundary identification, etc.).

Figure 4:
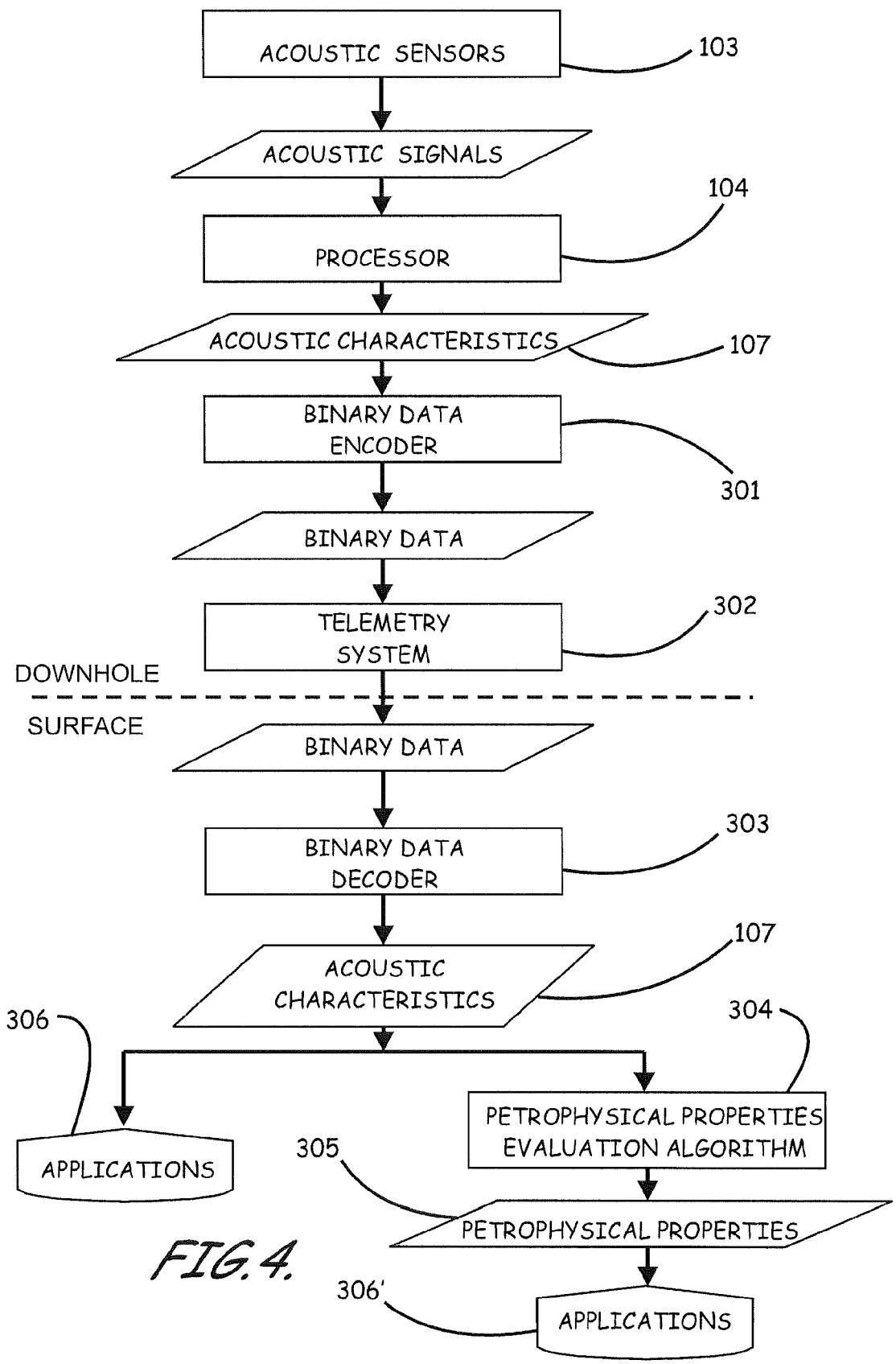
FIG. 4 is a schematic diagram illustrating acoustic information collection and analysis according to an embodiment of the present invention.

FIG. 4 illustrates a general procedure for drilling acoustic signal collection, downhole processing, transmitting, and surface processing according to an exemplary embodiment of the present invention. The derived acoustic characteristics 107 are encoded into binary data by a downhole data "transmitting" interface (e.g., binary data encoder 301). After being encoded, the binary data is transmitted to the surface by a borehole telemetry system 302. Referring also to FIG. 1, according to the exemplary configuration, a borehole telemetry system interface 111 receives the encoded binary data and transmits the data to a surface telemetry system interface 113 through a borehole telemetry medium, which is the drilling mud contained in the drill string inner bore in case a mud pulse telemetry system is used, for example. Utilization of other borehole telemetry media is/are, however, within the scope of the present invention.

According to the exemplary configuration, the surface telemetry system interface 113 is located at the stationary part of the top drive 114. In case a mud pulse telemetry system is used, the surface telemetry system interface (a pressure transducer) is located at a position along the mud pipeline (not shown), which feeds the drilling mud to the drill string. From the surface telemetry system interface 113, the acoustic signals are further transmitted to surface data "transmitting" interface (e.g. binary data decoder 303) through an electronic cable 108. The binary data received at the surface is correspondingly decoded by a binary data decoder 303 to restore the data back into acoustic characteristics (data) 107.

The acoustic characteristics data 107 may be applied directly by various applications 306, such as, for example, to identify lithology type and/or formation boundaries. For example, the mean frequency, the normalized deviation of frequency, the mean amplitude, the normalized deviation of amplitude, and the apparent power of the rock undergoing drilling can be compared with a corresponding mean frequency, normalized deviation of frequency, mean amplitude, normalized deviation of amplitude, and apparent power of a plurality of rock samples having different known lithologies, to thereby determine an amount of correlation of the acoustic characteristics associated with the rock undergoing drilling and the acoustic characteristics associated with the rock samples. Responsively, the lithology type of the rock undergoing drilling can be determined.

The acoustic characteristics data 107 may also be further processed by a petrophysical properties evaluation algorithm 304 to derive petrophysical properties, such as lithology type, porosity, presence of hydrocarbons, presence of fractures, etc., of the rock under drilling truly in real time. The derived petrophysical properties can beneficially be directly used in different applications 306'.

Referring to FIGS. 1, 2, and 4, according to an embodiment of the present invention, the digitized acoustic characteristics data 107 is read by a computer program 112 (e.g., the petrophysical properties evaluation program), installed in memory 122 accessible to processor 123 of computer 124. The computer program 112 analyzes the acoustic characteristics data 107 to derive petrophysical properties 305 of the rock undergoing drilling, for use by the various applications 306'. Such data along with rock sample data, rock modeling data, etc. can be stored in database 125 stored in either internal memory 122 or an external memory accessible to processor 123.

Note, the computer 124 can be in the form of a personal computer or in the form of a server or server farm serving multiple user interfaces or other configurations known to those skilled in the art. Note, the computer program 112 can be in the form of microcode, programs, routines, and symbolic languages that provide a specific set or sets of ordered operations that control the functioning of the hardware and direct its operation, as known and understood by those skilled in the art. Note also, the computer program 112, according to an embodiment of the present invention, need not reside in its entirety in volatile memory, but can be selectively loaded, as necessary, according to various methodologies as known and understood by those skilled in the art. Still further, at least portions of the computer program 112 can be stored in memory of the processor assembly 104 when so configured.

Figure 5:
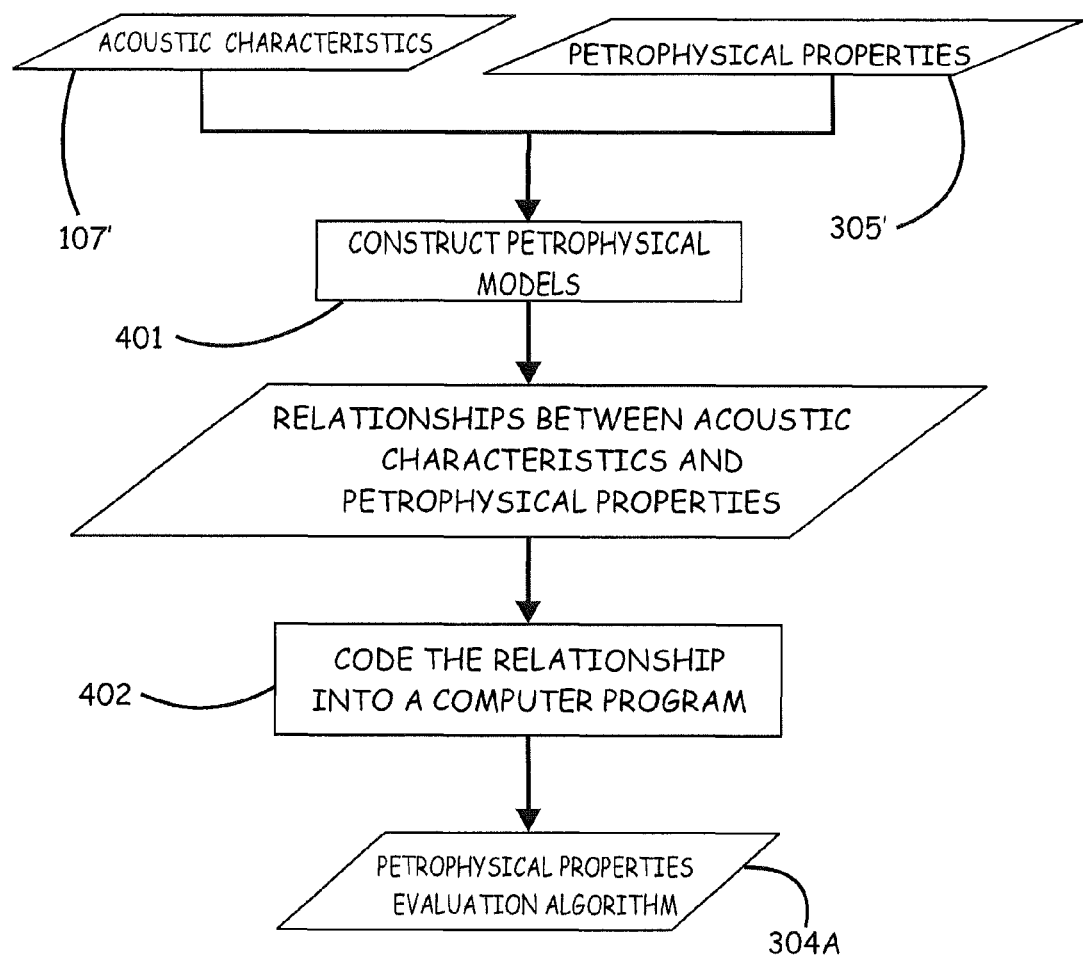
FIG. 5 is a schematic flow diagram illustrating steps for forming a petrophysical properties evaluation algorithm for a particular type of drill bit according to an embodiment of the present invention.
Figure 6:
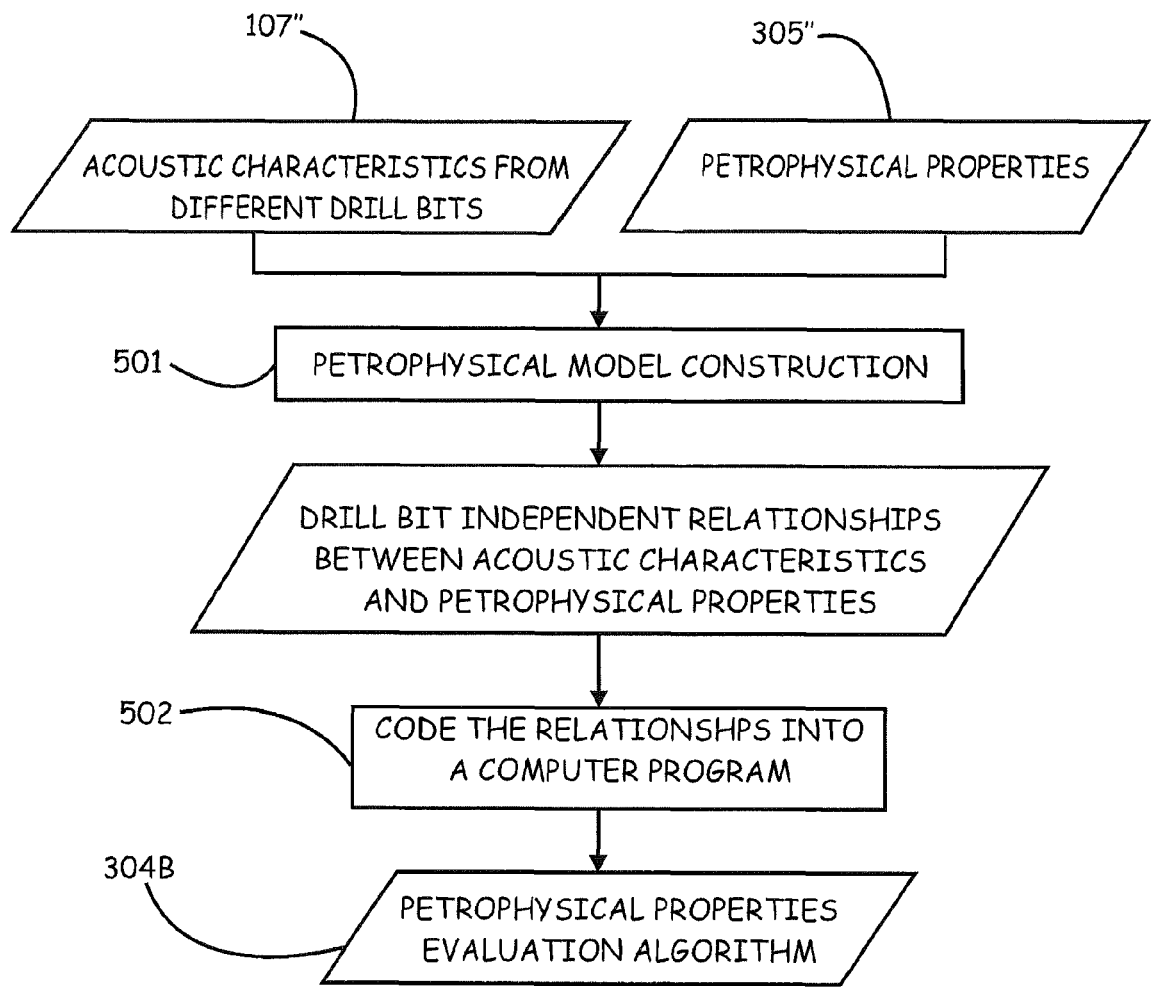
FIG. 6 is a schematic flow diagram illustrating steps for forming a drill bit independent petrophysical properties evaluation algorithm according to an embodiment of the present invention.

FIGS. 5 and 6 illustrate examples of the construction of two types of petrophysical properties evaluation algorithms 304: one designed for a particular type of drill bit shown at 304A and the other designed to be drill bit type independent shown at 304B. Unlike the acoustic characteristics evaluation algorithm 203, which are based on known mathematical equations, the petrophysical properties evaluation algorithm 304 is based on mathematical models, which are to be built utilizing acoustic data and petrophysical properties according to an exemplary configuration.

FIG. 5 illustrates the procedure for constructing a "Petrophysical Properties Evaluation Algorithm" for a particular type of drill bit. According to the exemplary configuration, datasets of petrophysical properties 305' and correspondent digitized acoustic characteristics data 107' for the particular drill bit are collected. The relationships between acoustic characteristics 107' and petrophysical properties 305' are constructed (step 401) using suitable mathematical modeling techniques, such as, multiple regression analysis, artificial neural networks modeling. Once relationships between the acoustic characteristics data 107' and petrophysical properties 305' are constructed, the relationships are coded (step 402) to produce a computer program, module, subroutine, object, or other type of instructions to define the "petrophysical properties evaluation algorithm" 304A. The algorithm 304A is then available to be used in the computer program 112 to predict the petrophysical properties from drilling acoustic signals for the particular drill bit type.

FIG. 6 illustrates the procedure for constructing a drill bit type independent "Petrophysical Properties Evaluation Algorithm" 304B. The datasets of petrophysical properties 305" and the correspondent acoustic characteristics data 107" measured from different types of drill bit are collected. The relationships between the acoustic characteristics 107" and the petrophysical properties 305" are constructed (step 501) using suitable mathematical modeling techniques, such as, for example, multiple regression analysis, artificial neural networks modeling, among others. During the relationships construction, the drill bit type is treated as one variable. Only the constructed relationships having least or insignificant dependence on the types of drill bit are accepted. Once the bit type independent relationships between acoustic characteristics 107" and petrophysical properties 305" are constructed, they are coded (step 502) into a computer program, module, subroutine, object, or other type of instructions to define the "petrophysical properties evaluation algorithm" 304B. The algorithm 304B is then available to be used in the computer program 112 to predict the petrophysical properties from the acoustic characteristics 107 for different types of drill bits.

FIGS. 5 and 6 demonstrate the feasibility of building a petrophysical properties evaluation algorithm 304 (FIG. 4) based on the relationship of acoustic characteristics 107 with petrophysical properties 305 (FIG. 4), which can be used to evaluate processed forms of the sound generated by operationally engaging the drilling bit with the rock being drilled. Similarly, FIG. 7 demonstrates the feasibility of using acoustic characteristics 107 to derive lithology information.

Figure 7:
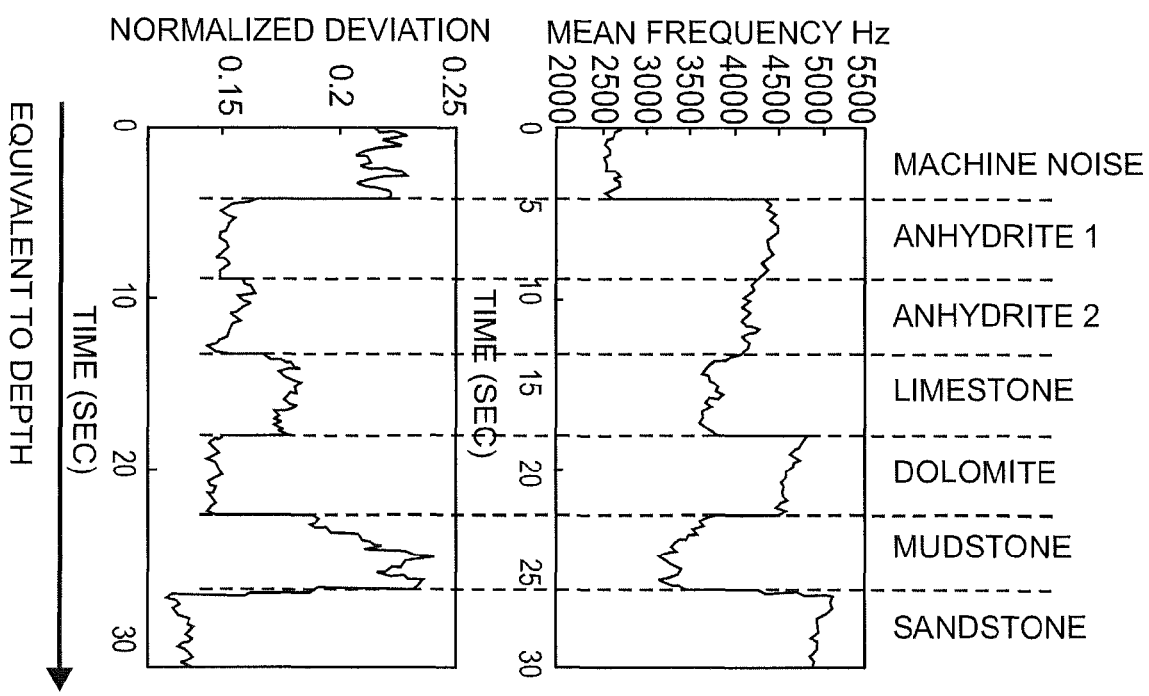
FIG. 7 is a graph illustrating a comparison of mean frequency and normalized deviation of frequency correlated with a plurality of lithology types according to an embodiment of the present invention.

In FIG. 7, mean frequency and normalized deviation of frequency were calculated from FFT data of the drilling sounds of a sample corer drilling into cores of different lithologies. As can be readily understood, both the mean frequency and the normalized deviation of frequency correlated well with the lithology types. As such, the figure demonstrates how the lithology types can be distinguished by the combination of either or both of the two characteristics: mean frequency and the normalized deviation of frequency. If mean amplitude, normalized deviation of the amplitude, and apparent power are also used, an even better result may be achieved. The figure also inherently demonstrates that formation boundaries can also be determined from acoustic characteristics.

Various embodiments of the present invention provide several advantages. For example, various embodiments of the present invention beneficially provide a means to identify lithology type and physical properties, truly in real-time. This advantage makes various embodiments of the present invention ideal in the applications of (1) horizontal and lateral well drill steering and (2) locating the relative position for setting the casing shoe at a much higher precision. Various embodiments can also be used to (3) detect fractured zones; and (4) interpret rock lithologies and petrophysical properties.

Various embodiments of the present invention beneficially supply true real time information for evaluating petrophysical properties of the rocks, such as lithology type, porosity, strength, and presence of hydrocarbons, through the utilization of data obtained through the analysis of acoustic signals to evaluate these petrophysical properties. According to various embodiments of the present invention, the driller always know the rock he is drilling, allowing the drill to be steered to follow the desired path more accurately. Compared with current drilling steering tools, which supply lithology information 30-50 feet behind the drill bit, various embodiments of the present invention allow a smoother lateral or horizontal well with better contact with the production zone, resulting in better well production.

Various embodiments of the present invention advantageously supply a new approach for locating the position for setting casing shoe at a much higher precision. Normally casing shoe is set below a formation boundary. When drilling crossing a boundary into a new formation, the current measurement-while-drilling tools only know it after 30-50 feet. Various embodiments of the present invention, however, identify the crossing immediately, enabling the driller to cast the casing show at the desired position.

Various embodiments of the present invention advantageously aid the driller in detecting detect fractured zones. The drill sound from a rock that is fractured should be different than that of a rock that is not fractured, allowing implementation of various embodiments of the present invention to detect the fractured zone from its drilling acoustic signals.

Various embodiments of the present invention supply additional information for evaluating petrophysical properties of the rocks that is conventionally available, real-time. Since some petrophysical properties, such as porosity, strength, and presence of hydrocarbons will affect the drilling acoustic signals, various embodiments of the present invention can use the acoustic signals to evaluate these petrophysical properties.

This application is a non-provisional of and claims priority to and the benefit of U.S. Provisional Patent Application No. 61/539,242 titled "Apparatus And Program Product For Evaluating Rock Properties While Drilling Using Downhole Acoustic Sensors And Telemetry System," filed on Sep. 26, 2011, and is related to U.S. patent application Ser. No. 13/554,369, filed on Jul. 20, 2012, titled "Methods of Evaluating Rock Properties While Drilling Using Downhole Acoustic Sensors and a Downhole Broadband Transmitting System"; U.S. patent application Ser. No. 13/553,958, filed on Jul. 20, 2012, titled "Methods of Evaluating Rock Properties While Drilling Using Downhole Acoustic Sensors and Telemetry System"; U.S. patent application Ser. No. 13/554,298, filed on Jul. 20, 2012, titled "Apparatus for Evaluating Rock Properties While Drilling Using Drilling Rig-Mounted Acoustic Sensors"; and U.S. patent application Ser. No. 13/554,470, filed on Jul. 20, 2012, titled "Methods for Evaluating Rock Properties While Drilling Using Drilling Rig-Mounted Acoustic Sensors"; U.S. patent application Ser. No. 13/554,077, filed on Jul. 20, 2013, titled "Apparatus, Computer Readable Medium, and Program Code For Evaluating Rock Properties While Drilling Using Downhole Acoustic Sensors and a Downhole Broadband Transmitting System; U.S. Provisional Patent Application No. 61/539,246 titled "Methods Of Evaluating Rock Properties While Drilling Using Downhole Acoustic Sensors And Telemetry System," filed on Sep. 26, 2011; U.S. Provisional Patent Application No. 61/539,201, titled "Apparatus For Evaluating Rock Properties While Drilling Using Drilling Rig-Mounted Acoustic Sensors," filed on Sep. 26, 2011; U.S. Provisional Patent Application No. 61/539,213, titled "Methods For Evaluating Rock Properties While Drilling Using Drilling Rig-Mounted Acoustic Sensors," filed on Sep. 26, 2011; U.S. Provisional Patent Application No. 61/539,165, titled "Apparatus And Program Product For Evaluating Rock Properties While Drilling Using Downhole Acoustic Sensors And A Downhole Broadband Transmitting System," filed on Sep. 26, 2011, and U.S. Provisional Patent Application No. 61/539,171, titled "Methods Of Evaluating Rock Properties While Drilling Using Downhole Acoustic Sensors And A Downhole Broadband Transmitting System" fled on Sep. 26, 2011; each incorporated herein by reference in its entirety.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification.

That claimed is:

1. An apparatus for identifying rock properties in real-time during drilling, the apparatus comprising:
   a downhole sensor subassembly connected between a drill bit and a drill string;
   one or more acoustic sensors carried by the downhole sensor subassembly and operably coupled to a downhole data interface;
   a downhole processor assembly operably coupled to the one or more acoustic sensors and operably coupled to a downhole data transmitting interface, the downhole processor assembly adapted to perform the following operations:
      receiving digitized raw acoustic sensor data from the one or more acoustic sensors, the raw acoustic sensor data representing an acoustic signal generated real-time as a result of rotational contact of the drill bit with rock during drilling, and
      processing the raw acoustic sensor data, the operation of processing including deriving a plurality of acoustic characteristics from the processed raw acoustic sensor data, the plurality of acoustic characteristics including mean frequency and normalized deviation of frequency; and
   a surface computer operably coupled to the downhole data transmitting interface through a surface data transmitting interface and a communication medium extending therebetween, the computer configured to perform the following operations:
      receiving acoustic characteristics data from the downhole processor assembly,
      performing one or more of the following processing operations at the surface computer:
         identifying lithology type of rock being encountered by the drill bit utilizing the mean frequency and the normalized deviation of frequency, and
         deriving petrophysical properties of rock being encountered by the drill bit from the acoustic characteristics data utilizing a petrophysical properties evaluation algorithm employable to predict one or more petrophysical properties of rock undergoing drilling utilizing one or more of the plurality of acoustic characteristics.

2. The apparatus as defined in claim 1, wherein the operation of processing the raw acoustic sensor data includes:
   sending sampling commands to a data acquisition unit in communication with the one or more acoustic sensors;
   converting analog acoustic sensor signals into digitized data through employment of the data acquisition unit;
   transforming the digitized data into Fast Fourier Transform data using a Fast Fourier transformation;
   filtering the Fast Fourier Transform data; and
   deriving the acoustic characteristics from the filtered Fast Fourier Transform data.

3. The apparatus as defined in claim 2,
   wherein the downhole processor assembly includes a processor, memory otherwise operably coupled with the processor, and acoustics characteristics evaluation firmware stored in the memory; and
   wherein the acoustic characteristics evaluation firmware includes an acoustic characteristics evaluation algorithm configured to evaluate the Filtered Fast Fourier Transform data for the acoustic characteristics.

4. The apparatus as defined in claim 1, wherein the one or more processing operations comprise identifying the lithology type of rock being encountered by the drill bit, and wherein the operation of identifying the lithology type includes the operations of:

comparing the mean frequency and the normalized deviation of frequency of the rock undergoing drilling with mean frequency and normalized deviation of frequency of a plurality of rock samples having different known lithologies; and identifying the lithology type of the rock undergoing drilling responsive to the operation of comparing.

5. The apparatus as defined in claim 1, wherein the plurality of acoustic characteristics further include mean amplitude, normalized deviation of amplitude, and apparent power, wherein the one or more processing operations comprise identifying the lithology type of rock being encountered by the drill bit, and wherein the operation of identifying the lithology type includes the operations of:

comparing the mean frequency, the normalized deviation of frequency, the mean amplitude, the normalized deviation of amplitude and the apparent power of the rock undergoing drilling with mean frequency, normalized deviation of frequency, mean amplitude, normalized deviation of amplitude, and apparent power of a plurality of rock samples having different known lithologies; and identifying lithology type of the rock undergoing drilling responsive to the operation of comparing.

6. The apparatus as defined in claim 5, wherein the operation of comparing is performed substantially continuously during drill bit steering, and wherein the computer is further adapted to perform the operations of:

determining a location of a formation boundary encountered during drilling responsive to the operation of comparing.

7. The apparatus as defined in claim 5, wherein one or more of the following: the mean frequency and normalized deviation of frequency and the mean frequency and the mean amplitude, are examined together as part of the operation of comparing to thereby determine an amount of correlation of the acoustic characteristics associated with the rock undergoing drilling and the acoustic characteristics associated with the rock samples.

8. The apparatus as defined in claim 1, wherein the one or more processing operations comprise deriving the petrophysical properties of rock being encountered by the drill bit from the acoustics characteristics data utilizing a petrophysical properties evaluation algorithm, wherein the petrophysical properties evaluation algorithm is a bit-specific petrophysical properties evaluation algorithm, and wherein the computer is further adapted to perform the operations of:

collecting petrophysical properties data describing one or more petrophysical properties of rock for a plurality of rock samples and correspondent acoustic characteristics data for a preselected type of drill bit;

determining one or more relationships between the acoustic characteristics data for the preselected type of drill bit and correspondent one or more petrophysical properties of rock describing petrophysical properties of a plurality of rock samples; and coding the determined relationships into computer program code defining the bit-specific petrophysical properties evaluation algorithm; and wherein the operation of deriving the petrophysical properties includes employing the derived petrophysical properties evaluation algorithm to predict one or more petrophysical properties of the rock undergoing drilling real-time responsive to acoustics characteristics data produced in response to the drilling.

9. The apparatus as defined in claim 1, wherein the one or more processing operations comprise deriving the petrophysical properties of rock being encountered by the drill bit from the acoustics characteristics data utilizing a petrophysical properties evaluation algorithm, wherein the petrophysical properties evaluation algorithm is a bit-independent petrophysical properties evaluation algorithm, and wherein the computer is further adapted to perform the operations of:

collecting petrophysical properties data describing one or more petrophysical properties of rocks for a plurality of rock samples and correspondent acoustic characteristics data for a plurality of different types of drill bits;

determining one or more relationships between the acoustic characteristics data and correspondent one or more petrophysical properties of the rocks to provide a bit-independent evaluation methodology; and coding the determined relationships into computer program code defining the petrophysical properties evaluation algorithm; and wherein the operation of deriving the petrophysical properties includes employing the derived petrophysical properties evaluation algorithm to predict one or more petrophysical properties of the rock undergoing drilling real-time responsive to the acoustic characteristics data produced in response to the drilling.

10. An apparatus for identifying rock properties in real-time during drilling, the apparatus comprising:

a drill string comprising a plurality of drill pipes each have an inner bore;

a drill bit connected to the downhole end of the drill string;

a downhole sensor subassembly connected to and between the drill bit and the drill string;

acoustic sensors contained by the downhole sensor subassembly and operably coupled to a downhole data transmitting interface;

a borehole telemetry system for carrying data to a surface computer, the borehole telemetry system comprising the downhole data transmitting interface, a communication medium operably coupled to the downhole data transmitting interface, and a surface data transmitting interface operably coupled to the communication medium;

a downhole processor assembly operably coupled to the one or more acoustic sensors and operably coupled to the downhole data transmitting interface, the downhole processor assembly adapted to perform the following operations:

receiving raw acoustic sensor data from the one or more acoustic sensors, the raw acoustic sensor data representing an acoustic signal generated real-time as a result of rotational contact of the drill bit with rock during drilling, and processing the raw acoustic sensor data, the operation of processing including deriving a plurality of acoustic characteristics from the processed raw acoustic sensor data, the plurality of acoustic characteristics comprising mean frequency and normalized deviation of frequency;

a top drive system for rotating the drill string, the top drive system including rotating and stationary portions, the surface data transmitting interface connected to a stationary portion of the top drive system; and a surface computer operably coupled to the downhole processor assembly through the downhole data transmitting interface, the communication medium, and surface data transmitting interface, the computer including a processor, memory in communication with the processor, and a petrophysical properties evaluation program stored in the memory, the computer configured to perform the following operations:

receiving acoustic characteristics data from the downhole processor assembly, performing one or more of the following processing operations at the surface computer:

identifying lithology type of rock being encountered by the drill bit utilizing the mean frequency and normalized deviation of frequency, and deriving petrophysical properties of rock being encountered by the drill bit from the acoustics characteristics data utilizing a petrophysical properties evaluation algorithm employable to predict one or more petrophysical properties of rock undergoing drilling utilizing one or more of the plurality of acoustic characteristics.

11. The apparatus as defined in claim 10, wherein the plurality of acoustic characteristics further comprise mean amplitude, normalized deviation of amplitude, and the apparent power, wherein the one or more processing operations comprise deriving the plurality of acoustic characteristics from the raw acoustic sensor data, and wherein the operation of performing one or more processing operations includes the operations of:

comparing the mean frequency, the normalized deviation of frequency, the mean amplitude, the normalized deviation of amplitude, and the apparent power of the rock undergoing drilling with mean frequency, normalized deviation of frequency, mean amplitude, normalized deviation of amplitude, and apparent power of a plurality of rock samples having different known lithologies, at least one of the mean frequency and the normalized deviation of frequency or the mean frequency and the mean amplitude being examined together to determine an amount of correlation of the acoustic characteristics associated with the rock undergoing drilling and the acoustic characteristics associated with the rock samples, the operation of comparing being performed substantially continuously during drill bit steering; and performing one or more of the following responsive to the operation of comparing:

identifying the lithology type of the rock undergoing drilling, and determining a location of a formation boundary encountered during drilling.

12. The apparatus as defined in claim 11, wherein one or more of the following: the mean frequency and the normalized deviation of frequency, and the mean frequency and the mean amplitude, are examined together as part of the operation of comparing to thereby determine an amount of correlation of the acoustic characteristics associated with the rock undergoing drilling and the acoustic characteristics associated with the rock samples.

13. The apparatus as defined in claim 10, wherein the one or more processing operations comprise deriving the petrophysical properties of rock being encountered by the drill bit, wherein the petrophysical properties evaluation algorithm is a bit-specific petrophysical properties evaluation algorithm, and wherein the computer is further adapted to perform the operations of:

collecting petrophysical properties data describing one or more petrophysical properties of rock for a plurality of rock samples and correspondent acoustic characteristics data for a preselected type of drill bit;

determining one or more relationships between the acoustic characteristics data for the predetermined type of drill bit and correspondent one or more petrophysical properties of rock describing petrophysical properties of a plurality of rock samples; and coding the determined relationships into computer program code defining the bit-specific petrophysical properties evaluation algorithm; and wherein the operation of deriving the petrophysical properties includes employing the derived petrophysical properties evaluation algorithm to predict one or more petrophysical properties of the rock undergoing drilling real-time responsive to acoustics characteristics data produced in response to the drilling.

14. The apparatus as defined in claim 10, wherein the one or more processing operations comprise deriving the petrophysical properties of rock being encountered by the drill bit, wherein the petrophysical properties evaluation algorithm is a bit-independent petrophysical properties evaluation algorithm, and wherein the computer is further adapted to perform the operations of:

collecting petrophysical properties data describing one or more petrophysical properties of rock for a plurality of rock samples and correspondent acoustic characteristics data for a plurality of different types of drill bits;

determining one or more relationships between the acoustic characteristics data and correspondent one or more petrophysical properties of the rock to provide a bit-independent evaluation methodology; and coding the determined relationships into computer program code defining the petrophysical properties evaluation algorithm; and wherein the operation of deriving the petrophysical properties includes employing the derived petrophysical properties evaluation algorithm to predict one or more petrophysical properties of the rock undergoing drilling real-time responsive to the acoustic characteristics data produced in response to the drilling.

15. A non-transitory computer readable medium having processor readable acoustics characteristics evaluation program code embodied on the computer readable medium, the processor readable program code for programming one or more processors to perform operations for evaluating acoustic sensor data generated as a result of rotational contact of a drill bit with rock during drilling for acoustic characteristics usable for determining properties of the rock real-time during drilling, the processor readable program code comprising a set of instructions that when executed by the one or more processors, cause the one or more processors to perform the operations of:

receiving raw acoustic sensor data from the one or more acoustic sensors, the raw acoustic sensor data representing an acoustic signal generated real-time as a result of rotational contact of the drill bit with rock during drilling; and processing the raw acoustic sensor data, the operation of processing including deriving a plurality of acoustic characteristics from the processed raw acoustic sensor data, the plurality of acoustic characteristics comprising mean frequency and normalized deviation of frequency;

transmitting the acoustic characteristics from a downhole processor assembly to a surface computer via a borehole telemetry system, wherein the surface computer is configured to perform one or more of the following operations at the surface computer:
  identifying lithology type of rock being encountered by the drill bit utilizing the mean frequency and the normalized deviation of frequency, and
  deriving petrophysical properties of rock being encountered by the drill bit from the acoustic characteristics data utilizing a petrophysical properties evaluation algorithm employable to predict one or more petrophysical properties of rock undergoing drilling utilizing one or more of the plurality of acoustic characteristics.

16. The non-transitory computer readable medium as defined in claim 15, wherein the operation of processing the raw acoustic sensor data includes:
  sending sampling commands to a data acquisition unit in communication with the one or more acoustic sensors;
  converting analog acoustic sensor signals into digitized data through employment of the data acquisition unit;
  transforming the digitized data into Fast Fourier Transform data using a Fast Fourier transformation;
  filtering the Fast Fourier Transform data; and
  deriving the acoustic characteristics from the filtered Fast Fourier Transform data.

17. The non-transitory computer readable medium as defined in claim 15, wherein the acoustic characteristics further comprise one or more of the following: mean amplitude, normalized deviation of amplitude, and apparent power.

18. A non-transitory computer readable medium having processor readable petrophysical properties evaluation program code embodied on the computer readable medium, the processor readable program code for programming one or more processors to perform operations for evaluating properties of rock in a formation in real-time during drilling, the processor readable program code comprising a set of instructions that when executed by the one or more processors, cause the one or more processors to perform the operations of:
  receiving acoustic characteristics data from a downhole processor assembly, the acoustic characteristics data providing one or more acoustic characteristics evaluated from an acoustic signal provided by one or more acoustic sensors positioned adjacent a drill bit generated real-time as a result of rotational contact of the drill bit with rock during drilling, the one or more acoustic characteristics comprising mean frequency and normalized deviation of frequency; and
  performing one or more of the following processing operations at the downhole processor assembly:
    identifying lithology type of rock being encountered by the drill bit utilizing mean frequency and the normalized deviation of frequency, and
    deriving petrophysical properties of rock being encountered by the drill bit utilizing a petrophysical properties evaluation algorithm employable to predict one or more petrophysical properties of rock undergoing drilling utilizing the one or more acoustic characteristics.

19. The non-transitory computer readable medium as defined in claim 18, wherein the one or more processing operations comprise identifying the lithology type of rock being encountered by the drill bit, and wherein the operation of identifying the lithology type includes the operations of:
  comparing the mean frequency and the normalized deviation of frequency of the rock undergoing drilling with mean frequency and normalized deviation of frequency of a plurality of rock samples having different know lithologies; and
  identifying the lithology type of the rock undergoing drilling responsive to the operation of comparing.

20. The non-transitory computer readable medium as defined in claim 18, wherein the acoustic characteristics further comprise mean amplitude, normalized deviation of amplitude, and apparent power, wherein the one or more processing operations comprise identifying the lithology type of rock being encountered by the drill bit, and wherein the operation of identifying the lithology type includes the operations of:
  comparing the mean frequency, the normalized deviation of frequency, the mean amplitude, the normalized deviation of amplitude, and the apparent power of the rock undergoing drilling with mean frequency, normalized deviation of frequency, mean amplitude, normalized deviation of amplitude, and apparent power of a plurality of rock samples having different known lithologies; and
  identifying the lithology type of the rock undergoing drilling responsive to the operation of comparing.

21. The non-transitory computer readable medium as defined in claim 20, wherein the mean frequency and the normalized deviation of frequency, the mean frequency and mean amplitude, or the mean frequency, mean amplitude, normalized deviation of frequency, normalized deviation of amplitude, and apparent power, are examined together as part of the operation of comparing to thereby determine an amount of correlation of the acoustic characteristics associated with the rock undergoing drilling and the acoustic characteristics associated with the rock samples.

22. The non-transitory computer readable medium as defined in claim 18,
  wherein the acoustic characteristics further comprise mean amplitude, normalized deviation of amplitude, and apparent power;
  wherein the one or more processing operations comprise identifying the lithology type of rock being encountered by the drill bit;
  wherein the operation of identifying the lithology type includes the operation of comparing the mean frequency, the normalized deviation of frequency, the mean amplitude, the normalized deviation of amplitude, and the apparent power of the rock undergoing drilling with mean frequency, normalized deviation of frequency, mean amplitude, normalized deviation of amplitude, and apparent power of a plurality of rock samples having different known lithologies; and
  wherein the operations further comprise determining a location of a formation boundary encountered during drilling responsive to the operation of comparing.

23. The non-transitory computer readable medium as defined in claim 18, wherein the one or more petrophysical properties comprise: lithology type, porosity, and presence of hydrocarbons in rock undergoing drilling when existing and presence of fractures in the rock undergoing drilling when existing.

24. The non-transitory computer readable medium as defined in claim 18, wherein the one or more processing operations comprise deriving petrophysical properties of rock being encountered by the drill bit from the acoustic characteristics data utilizing a petrophysical properties evaluation algorithm, wherein the petrophysical properties evaluation algorithm is a bit-specific petrophysical properties evaluation algorithm, the operations further comprising:

collecting petrophysical properties data describing one or more petrophysical properties of rock for a plurality of rock samples and correspondent acoustic characteristics data for a preselected type of drill bit;

determining one or more relationships between the acoustic characteristics data for the preselected type of drill bit and correspondent one or more petrophysical properties of rock describing petrophysical properties of a plurality of rock samples; and coding the determined relationships into computer program code defining the bit-specific petrophysical properties evaluation algorithm; and wherein the operation of deriving the petrophysical properties includes employing the derived petrophysical properties evaluation algorithm to predict one or more petrophysical properties of the rock undergoing drilling real-time responsive to acoustics characteristics data produced in response to the drilling.

25. The non-transitory computer readable medium as defined in claim 18, wherein the one or more processing operations comprise deriving the petrophysical properties of rock being encountered by the drill bit from the acoustic characteristics data utilizing a petrophysical properties evaluation algorithm, and wherein the petrophysical properties evaluation algorithm is a bit-independent petrophysical properties evaluation algorithm, the operations further comprising:

collecting petrophysical properties data describing one or more petrophysical properties of rock for a plurality of rock samples and correspondent acoustic characteristics data for a plurality of different types of drill bits;

determining one or more relationships between the acoustic characteristics data and correspondent one or more petrophysical properties of the rocks to provide a bit-independent evaluation methodology; and coding the determined relationships into computer program code defining the petrophysical properties evaluation algorithm; and wherein the operation of deriving the petrophysical properties includes employing the derived petrophysical properties evaluation algorithm to predict one or more petrophysical properties of the rock undergoing drilling real-time responsive to the acoustic characteristics data produced in response to the drilling.

26. An apparatus for identifying rock properties in real-time during drilling, the apparatus comprising:

a downhole sensor subassembly connected between a drill bit and a drill string;

one or more acoustic sensors carried by the downhole sensor subassembly and operably coupled to a downhole data transmitting interface; and a borehole telemetry system for carrying data to a surface computer, the borehole telemetry system comprising the downhole data transmitting interface, a communication medium operably coupled to the downhole data transmitting interface, and a surface data transmitting interface operably coupled to the communication medium;

a downhole processor assembly operably coupled to the one or more acoustic sensors and operably coupled to the downhole data transmitting interface, the downhole processor assembly adapted to perform the following operations:

receiving raw acoustic sensor data from the one or more acoustic sensors, the raw acoustic sensor data representing an acoustic signal generated real-time as a result of rotational contact of the drill bit with rock during drilling, and processing the raw acoustic sensor data, the operation of processing including deriving a plurality of acoustic characteristics from the processed raw acoustic sensor data, the plurality of acoustic characteristics comprising mean frequency and normalized deviation of frequency;

transmitting the acoustic characteristics from the downhole processor assembly to the surface computer via a borehole telemetry system, the surface computer adapted to perform one or more of the following operations at the surface computer:

identifying lithology type of rock being encountered by the drill bit utilizing the mean frequency and the normalized deviation of frequency, and deriving petrophysical properties of rock being encountered by the drill bit from the acoustic characteristics data utilizing a petrophysical properties evaluation algorithm employable to predict one or more petrophysical properties of rock undergoing drilling utilizing one or more of the plurality of acoustic characteristics.

27. The apparatus as defined in claim 26, wherein the apparatus further comprises:

the surface computer, wherein the surface computer is operably coupled to the downhole data transmitting interface through a surface data transmitting interface and a communication medium extending therebetween, the computer adapted to perform the following operations:

receiving acoustic characteristics data from the downhole processor assembly.

* * * * *